US011886639B2

(12) United States Patent
Brown

(10) Patent No.: US 11,886,639 B2
(45) Date of Patent: Jan. 30, 2024

(54) ULTRAHAPTICONS

(71) Applicants: Ultraleap Limited, Bristol (GB); The University of Nottingham, Nottingham (GB)

(72) Inventor: Eddie Brown, Bristol (GB)

(73) Assignees: ULTRALEAP LIMITED, Bristol (GB); THE UNIVERSITY OF NOTTINGHAM, Nottingham (GB)

(*) Notice: Subject to any disclaimer, the term of this patent is extended or adjusted under 35 U.S.C. 154(b) by 120 days.

(21) Appl. No.: 17/477,536

(22) Filed: Sep. 17, 2021

(65) Prior Publication Data

US 2022/0083142 A1 Mar. 17, 2022

Related U.S. Application Data

(60) Provisional application No. 63/079,708, filed on Sep. 17, 2020.

(51) Int. Cl.
*G06F 3/01* (2006.01)
*B06B 1/16* (2006.01)

(52) U.S. Cl.
CPC .............. *G06F 3/016* (2013.01); *B06B 1/166* (2013.01); *G06F 3/014* (2013.01); *G06F 3/017* (2013.01)

(58) Field of Classification Search
CPC .......... G06F 3/016; G06F 3/014; G06F 3/017; B06B 1/166
See application file for complete search history.

(56) References Cited

U.S. PATENT DOCUMENTS

| 4,218,921 | A | 8/1980 | Berge |
| 4,760,525 | A | 7/1988 | Webb |
| 4,771,205 | A | 9/1988 | Mequio |
| 4,881,212 | A | 11/1989 | Takeuchi |

(Continued)

FOREIGN PATENT DOCUMENTS

| CA | 2470115 A1 | 6/2003 |
| CA | 2909804 A1 | 11/2014 |

(Continued)

OTHER PUBLICATIONS

Young et al. "Designing Mid-Air Haptic Gesture Controlled User Interfaces for Cars", Proceedings of the ACM On Human-Computer Interaction, ACM PUB2Z7, New York, NY, USA, vol. 4, No. EICS, Jun. 18, 2020 (2020-96-18), pp. 1-23.*

(Continued)

*Primary Examiner* — Phuong H Nguyen
(74) *Attorney, Agent, or Firm* — Koffsky Schwalb LLC; Mark I. Koffsky

(57) ABSTRACT

Described herein are "Ultrahapticons," which are a set of tangible and recognizable mid-air haptic icons that have been derived from research study participants' metaphorical associations with car infotainment features. In line with semiotic theory (the study of signs), data from the study was analyzed to identify key characteristics that when realized in mid-air haptic form, would enable a user to "feel" the feature they are interacting with. Their use is not limited to an automotive context, they can be instrumented to any application that exhibits the same feature functionality i.e. home entertainment system, laptop UI's, digital communication, Extended Reality (XR), and the like.

10 Claims, 18 Drawing Sheets

(56) References Cited

U.S. PATENT DOCUMENTS

| | | |
|---|---|---|
| 5,226,000 A | 7/1993 | Moses |
| 5,235,986 A | 8/1993 | Maslak |
| 5,243,344 A | 9/1993 | Koulopoulos |
| 5,329,682 A | 7/1994 | Thurn |
| 5,371,834 A | 12/1994 | Tawel |
| 5,422,431 A | 6/1995 | Ichiki |
| 5,426,388 A | 6/1995 | Flora |
| 5,477,736 A | 12/1995 | Lorraine |
| 5,511,296 A | 4/1996 | Dias |
| 5,729,694 A | 3/1998 | Holzrichter |
| 5,859,915 A | 1/1999 | Norris |
| 6,029,518 A | 2/2000 | Oeftering |
| 6,193,936 B1 | 2/2001 | Gardner |
| 6,216,538 B1 | 4/2001 | Yasuda |
| 6,436,051 B1 | 8/2002 | Morris |
| 6,503,204 B1 | 1/2003 | Sumanaweera |
| 6,647,359 B1 | 11/2003 | Verplank |
| 6,771,294 B1 | 8/2004 | Pulli |
| 6,772,490 B2 | 8/2004 | Toda |
| 6,800,987 B2 | 10/2004 | Toda |
| 7,107,159 B2 | 9/2006 | German |
| 7,109,789 B2 | 9/2006 | Spencer |
| 7,182,726 B2 | 2/2007 | Williams |
| 7,225,404 B1 | 5/2007 | Zilles |
| 7,284,027 B2 | 10/2007 | Jennings, III |
| 7,345,600 B1 | 3/2008 | Fedigan |
| 7,487,662 B2 | 2/2009 | Schabron |
| 7,497,662 B2 | 3/2009 | Mollmann |
| 7,577,260 B1 | 8/2009 | Hooley |
| 7,692,661 B2 | 4/2010 | Cook |
| RE42,192 E | 3/2011 | Schabron |
| 7,966,134 B2 | 6/2011 | German |
| 8,000,481 B2 | 8/2011 | Nishikawa |
| 8,123,502 B2 | 2/2012 | Blakey |
| 8,269,168 B1 | 9/2012 | Axelrod |
| 8,279,193 B1 | 10/2012 | Birnbaum |
| 8,351,646 B2 | 1/2013 | Fujimura |
| 8,369,973 B2 | 2/2013 | Risbo |
| 8,594,350 B2 | 11/2013 | Hooley |
| 8,607,922 B1 | 12/2013 | Werner |
| 8,782,109 B2 | 7/2014 | Tsutsui |
| 8,823,674 B2 | 9/2014 | Birnbaum |
| 8,833,510 B2 | 9/2014 | Koh |
| 8,884,927 B1 | 11/2014 | Cheatham, III |
| 9,208,664 B1 | 12/2015 | Peters |
| 9,267,735 B2 | 2/2016 | Funayama |
| 9,421,291 B2 | 8/2016 | Robert |
| 9,612,658 B2 | 4/2017 | Subramanian |
| 9,662,680 B2 | 5/2017 | Yamamoto |
| 9,667,173 B1 | 5/2017 | Kappus |
| 9,816,757 B1 | 11/2017 | Zielinski |
| 9,841,819 B2 | 12/2017 | Carter |
| 9,863,699 B2 | 1/2018 | Corbin, III |
| 9,898,089 B2 | 2/2018 | Subramanian |
| 9,945,818 B2 | 4/2018 | Ganti |
| 9,958,943 B2 | 5/2018 | Long |
| 9,977,120 B2 | 5/2018 | Carter |
| 10,101,811 B2 | 10/2018 | Carter |
| 10,101,814 B2 | 10/2018 | Carter |
| 10,133,353 B2 | 11/2018 | Eid |
| 10,140,776 B2 | 11/2018 | Schwarz |
| 10,146,353 B1 | 12/2018 | Smith |
| 10,168,782 B1 | 1/2019 | Tchon |
| 10,268,275 B2 | 4/2019 | Carter |
| 10,281,567 B2 | 5/2019 | Carter |
| 10,318,008 B2 | 6/2019 | Sinha |
| 10,444,842 B2 | 10/2019 | Long |
| 10,469,973 B2 | 11/2019 | Hayashi |
| 10,496,175 B2 | 12/2019 | Long |
| 10,497,358 B2 | 12/2019 | Tester |
| 10,510,357 B2 | 12/2019 | Kovesi |
| 10,520,252 B2 | 12/2019 | Momen |
| 10,523,159 B2 | 12/2019 | Megretski |
| 10,531,212 B2 | 1/2020 | Long |
| 10,535,174 B1 | 1/2020 | Rigiroli |
| 10,569,300 B2 | 2/2020 | Hoshi |
| 10,593,101 B1 | 3/2020 | Han |
| 10,599,434 B1 | 3/2020 | Barrett |
| 10,657,704 B1 | 5/2020 | Han |
| 10,685,538 B2 | 6/2020 | Carter |
| 10,755,538 B2 | 8/2020 | Carter |
| 10,818,162 B2 | 10/2020 | Carter |
| 10,911,861 B2 | 2/2021 | Buckland |
| 10,915,177 B2 | 2/2021 | Carter |
| 10,921,890 B2 | 2/2021 | Subramanian |
| 10,930,123 B2 | 2/2021 | Carter |
| 10,943,578 B2 | 3/2021 | Long |
| 10,991,074 B2 | 4/2021 | Bousmalis |
| 11,048,329 B1 | 6/2021 | Lee |
| 11,098,951 B2 | 8/2021 | Kappus |
| 11,113,860 B2 | 9/2021 | Rigiroli |
| 11,169,610 B2 | 11/2021 | Sarafianou |
| 11,189,140 B2 | 11/2021 | Long |
| 11,204,644 B2 | 12/2021 | Long |
| 11,276,281 B2 | 3/2022 | Carter |
| 11,531,395 B2 | 12/2022 | Kappus |
| 11,543,507 B2 | 1/2023 | Carter |
| 11,550,395 B2 | 1/2023 | Beattie |
| 11,550,432 B2 | 1/2023 | Carter |
| 11,553,295 B2 | 1/2023 | Kappus |
| 11,714,492 B2 | 8/2023 | Carter |
| 11,715,453 B2 | 8/2023 | Kappus |
| 11,727,790 B2 | 8/2023 | Carter |
| 11,740,018 B2 | 8/2023 | Kappus |
| 11,742,870 B2 | 8/2023 | Long |
| 2001/0007591 A1 | 7/2001 | Pompei |
| 2001/0033124 A1 | 10/2001 | Norris |
| 2002/0149570 A1 | 10/2002 | Knowles |
| 2003/0024317 A1 | 2/2003 | Miller |
| 2003/0144032 A1 | 7/2003 | Brunner |
| 2003/0182647 A1 | 9/2003 | Radeskog |
| 2004/0005715 A1 | 1/2004 | Schabron |
| 2004/0014434 A1 | 1/2004 | Haardt |
| 2004/0052387 A1 | 3/2004 | Norris |
| 2004/0091119 A1 | 5/2004 | Duraiswami |
| 2004/0210158 A1 | 10/2004 | Organ |
| 2004/0226378 A1 | 11/2004 | Oda |
| 2004/0264707 A1 | 12/2004 | Yang |
| 2005/0052714 A1 | 3/2005 | Klug |
| 2005/0056851 A1 | 3/2005 | Althaus |
| 2005/0148874 A1 | 7/2005 | Brock-Fisher |
| 2005/0212760 A1 | 9/2005 | Marvit |
| 2005/0226437 A1 | 10/2005 | Pellegrini |
| 2005/0267695 A1 | 12/2005 | German |
| 2005/0273483 A1 | 12/2005 | Dent |
| 2006/0085049 A1 | 4/2006 | Cory |
| 2006/0090955 A1 | 5/2006 | Cardas |
| 2006/0091301 A1 | 5/2006 | Trisnadi |
| 2006/0164428 A1 | 7/2006 | Cook |
| 2007/0036492 A1 | 2/2007 | Lee |
| 2007/0094317 A1 | 4/2007 | Wang |
| 2007/0177681 A1 | 8/2007 | Choi |
| 2007/0214462 A1 | 9/2007 | Boillot |
| 2007/0236450 A1 | 10/2007 | Colgate |
| 2007/0263741 A1 | 11/2007 | Erving |
| 2008/0012647 A1 | 1/2008 | Risbo |
| 2008/0027686 A1 | 1/2008 | Mollmann |
| 2008/0084789 A1 | 4/2008 | Altman |
| 2008/0130906 A1 | 6/2008 | Goldstein |
| 2008/0152191 A1 | 6/2008 | Fujimura |
| 2008/0226088 A1 | 9/2008 | Aarts |
| 2008/0273723 A1 | 11/2008 | Hartung |
| 2008/0300055 A1 | 12/2008 | Lutnick |
| 2009/0093724 A1 | 4/2009 | Pernot |
| 2009/0116660 A1 | 5/2009 | Croft, III |
| 2009/0232684 A1 | 9/2009 | Hirata |
| 2009/0251421 A1 | 10/2009 | Bloebaum |
| 2009/0319065 A1 | 12/2009 | Risbo |
| 2010/0013613 A1 | 1/2010 | Weston |
| 2010/0016727 A1 | 1/2010 | Rosenberg |
| 2010/0030076 A1 | 2/2010 | Vortman |
| 2010/0044120 A1 | 2/2010 | Richter |
| 2010/0066512 A1 | 3/2010 | Rank |
| 2010/0085168 A1 | 4/2010 | Kyung |

(56) References Cited

U.S. PATENT DOCUMENTS

| | | |
|---|---|---|
| 2010/0103246 A1 | 4/2010 | Schwerdtner |
| 2010/0109481 A1 | 5/2010 | Buccafusca |
| 2010/0199232 A1 | 8/2010 | Mistry |
| 2010/0231508 A1 | 9/2010 | Cruz-Hernandez |
| 2010/0262008 A1 | 10/2010 | Roundhill |
| 2010/0302015 A1 | 12/2010 | Kipman |
| 2010/0321216 A1 | 12/2010 | Jonsson |
| 2011/0006888 A1 | 1/2011 | Bae |
| 2011/0010958 A1 | 1/2011 | Clark |
| 2011/0051554 A1 | 3/2011 | Varray |
| 2011/0066032 A1 | 3/2011 | Vitek |
| 2011/0199342 A1 | 8/2011 | Vartanian |
| 2011/0310028 A1 | 12/2011 | Camp, Jr. |
| 2012/0057733 A1 | 3/2012 | Morii |
| 2012/0063628 A1 | 3/2012 | Rizzello |
| 2012/0066280 A1 | 3/2012 | Tsutsui |
| 2012/0223880 A1 | 9/2012 | Birnbaum |
| 2012/0229400 A1 | 9/2012 | Birnbaum |
| 2012/0229401 A1 | 9/2012 | Birnbaum |
| 2012/0236689 A1 | 9/2012 | Brown |
| 2012/0243374 A1 | 9/2012 | Dahl |
| 2012/0249409 A1 | 10/2012 | Toney |
| 2012/0249474 A1 | 10/2012 | Pratt |
| 2012/0299853 A1 | 11/2012 | Dagar |
| 2012/0307649 A1 | 12/2012 | Park |
| 2012/0315605 A1 | 12/2012 | Cho |
| 2013/0035582 A1 | 2/2013 | Radulescu |
| 2013/0079621 A1 | 3/2013 | Shoham |
| 2013/0094678 A1 | 4/2013 | Scholte |
| 2013/0100008 A1 | 4/2013 | Marti |
| 2013/0101141 A1 | 4/2013 | Mcelveen |
| 2013/0173658 A1 | 7/2013 | Adelman |
| 2013/0331705 A1 | 12/2013 | Fraser |
| 2014/0027201 A1 | 1/2014 | Islam |
| 2014/0104274 A1 | 4/2014 | Hilliges |
| 2014/0139071 A1 | 5/2014 | Yamamoto |
| 2014/0168091 A1 | 6/2014 | Jones |
| 2014/0201666 A1 | 7/2014 | Bedikian |
| 2014/0204002 A1 | 7/2014 | Bennet |
| 2014/0265572 A1 | 9/2014 | Siedenburg |
| 2014/0267065 A1 | 9/2014 | Levesque |
| 2014/0269207 A1 | 9/2014 | Baym |
| 2014/0269208 A1 | 9/2014 | Baym |
| 2014/0269214 A1 | 9/2014 | Baym |
| 2014/0270305 A1 | 9/2014 | Baym |
| 2014/0320436 A1 | 10/2014 | Modarres |
| 2014/0361988 A1 | 12/2014 | Katz |
| 2014/0369514 A1 | 12/2014 | Baym |
| 2015/0002477 A1 | 1/2015 | Cheatham, III |
| 2015/0005039 A1 | 1/2015 | Liu |
| 2015/0006645 A1 | 1/2015 | Oh |
| 2015/0007025 A1 | 1/2015 | Sassi |
| 2015/0013023 A1 | 1/2015 | Wang |
| 2015/0019299 A1 | 1/2015 | Harvey |
| 2015/0022466 A1 | 1/2015 | Levesque |
| 2015/0029155 A1 | 1/2015 | Lee |
| 2015/0066445 A1 | 3/2015 | Lin |
| 2015/0070147 A1 | 3/2015 | Cruz-Hernandez |
| 2015/0070245 A1 | 3/2015 | Han |
| 2015/0078136 A1 | 3/2015 | Sun |
| 2015/0081110 A1 | 3/2015 | Houston |
| 2015/0084929 A1 | 3/2015 | Lee |
| 2015/0110310 A1 | 4/2015 | Minnaar |
| 2015/0130323 A1 | 5/2015 | Harris |
| 2015/0168205 A1 | 6/2015 | Lee |
| 2015/0192995 A1 | 7/2015 | Subramanian |
| 2015/0209564 A1 | 7/2015 | Lewin |
| 2015/0220199 A1 | 8/2015 | Wang |
| 2015/0226537 A1 | 8/2015 | Schorre |
| 2015/0226831 A1 | 8/2015 | Nakamura |
| 2015/0241393 A1 | 8/2015 | Ganti |
| 2015/0248787 A1 | 9/2015 | Abovitz |
| 2015/0258431 A1 | 9/2015 | Stafford |
| 2015/0277610 A1 | 10/2015 | Kim |
| 2015/0293592 A1 | 10/2015 | Cheong |
| 2015/0304789 A1 | 10/2015 | Babayoff |
| 2015/0323667 A1 | 11/2015 | Przybyla |
| 2015/0331576 A1 | 11/2015 | Piya |
| 2015/0332075 A1 | 11/2015 | Burch |
| 2016/0019762 A1 | 1/2016 | Levesque |
| 2016/0019879 A1 | 1/2016 | Daley |
| 2016/0026253 A1 | 1/2016 | Bradski |
| 2016/0044417 A1 | 2/2016 | Clemen, Jr. |
| 2016/0124080 A1 | 5/2016 | Carter |
| 2016/0138986 A1 | 5/2016 | Carlin |
| 2016/0175701 A1 | 6/2016 | Froy |
| 2016/0175709 A1 | 6/2016 | Idris |
| 2016/0189702 A1 | 6/2016 | Blanc |
| 2016/0242724 A1 | 8/2016 | Lavallee |
| 2016/0246374 A1* | 8/2016 | Carter ................... G06F 3/167 |
| 2016/0249150 A1 | 8/2016 | Carter |
| 2016/0291716 A1 | 10/2016 | Boser |
| 2016/0306423 A1 | 10/2016 | Uttermann |
| 2016/0320843 A1 | 11/2016 | Long |
| 2016/0339132 A1 | 11/2016 | Cosman |
| 2016/0374562 A1 | 12/2016 | Vertikov |
| 2017/0002839 A1 | 1/2017 | Bukland |
| 2017/0004819 A1 | 1/2017 | Ochiai |
| 2017/0018171 A1 | 1/2017 | Carter |
| 2017/0024921 A1 | 1/2017 | Beeler |
| 2017/0052148 A1 | 2/2017 | Estevez |
| 2017/0123487 A1 | 5/2017 | Hazra |
| 2017/0123499 A1 | 5/2017 | Eid |
| 2017/0140552 A1 | 5/2017 | Woo |
| 2017/0144190 A1 | 5/2017 | Hoshi |
| 2017/0153707 A1 | 6/2017 | Subramanian |
| 2017/0168586 A1 | 6/2017 | Sinha |
| 2017/0181725 A1 | 6/2017 | Han |
| 2017/0193768 A1 | 7/2017 | Long |
| 2017/0193823 A1 | 7/2017 | Jiang |
| 2017/0211022 A1 | 7/2017 | Reinke |
| 2017/0236506 A1 | 8/2017 | Przybyla |
| 2017/0270356 A1 | 9/2017 | Sills |
| 2017/0279951 A1 | 9/2017 | Hwang |
| 2017/0336860 A1 | 11/2017 | Smoot |
| 2017/0366908 A1 | 12/2017 | Long |
| 2018/0035891 A1 | 2/2018 | Van Soest |
| 2018/0039333 A1 | 2/2018 | Carter |
| 2018/0047259 A1 | 2/2018 | Carter |
| 2018/0074580 A1 | 3/2018 | Hardee |
| 2018/0081439 A1 | 3/2018 | Daniels |
| 2018/0101234 A1 | 4/2018 | Carter |
| 2018/0139557 A1 | 5/2018 | Ochiai |
| 2018/0146306 A1 | 5/2018 | Benattar |
| 2018/0151035 A1 | 5/2018 | Maalouf |
| 2018/0166063 A1 | 6/2018 | Long |
| 2018/0181203 A1* | 6/2018 | Subramanian ..... G01C 21/3652 |
| 2018/0182372 A1 | 6/2018 | Tester |
| 2018/0190007 A1 | 7/2018 | Panteleev |
| 2018/0246576 A1 | 8/2018 | Long |
| 2018/0253627 A1 | 9/2018 | Baradel |
| 2018/0267156 A1 | 9/2018 | Carter |
| 2018/0304310 A1 | 10/2018 | Long |
| 2018/0309515 A1 | 10/2018 | Murakowski |
| 2018/0310111 A1 | 10/2018 | Kappus |
| 2018/0350339 A1 | 12/2018 | Macours |
| 2018/0361174 A1 | 12/2018 | Radulescu |
| 2019/0001129 A1 | 1/2019 | Rosenbluth |
| 2019/0038496 A1 | 2/2019 | Levesque |
| 2019/0091565 A1 | 3/2019 | Nelson |
| 2019/0163275 A1 | 5/2019 | Iodice |
| 2019/0175077 A1 | 6/2019 | Zhang |
| 2019/0187244 A1 | 6/2019 | Riccardi |
| 2019/0196578 A1 | 6/2019 | Iodice |
| 2019/0196591 A1 | 6/2019 | Long |
| 2019/0197840 A1 | 6/2019 | Kappus |
| 2019/0197841 A1 | 6/2019 | Carter |
| 2019/0197842 A1 | 6/2019 | Long |
| 2019/0204925 A1 | 7/2019 | Long |
| 2019/0206202 A1 | 7/2019 | Carter |
| 2019/0235628 A1 | 8/2019 | Lacroix |
| 2019/0257932 A1 | 8/2019 | Carter |
| 2019/0310710 A1 | 10/2019 | Deeley |
| 2019/0342654 A1 | 11/2019 | Buckland |

(56) References Cited

U.S. PATENT DOCUMENTS

| | | |
|---|---|---|
| 2020/0042091 A1 | 2/2020 | Long |
| 2020/0080776 A1 | 3/2020 | Kappus |
| 2020/0082221 A1 | 3/2020 | Tsai |
| 2020/0082804 A1 | 3/2020 | Kappus |
| 2020/0103974 A1 | 4/2020 | Carter |
| 2020/0117229 A1 | 4/2020 | Long |
| 2020/0193269 A1 | 6/2020 | Park |
| 2020/0218354 A1 | 7/2020 | Beattie |
| 2020/0257371 A1* | 8/2020 | Sung ............... B60K 35/00 |
| 2020/0294299 A1 | 9/2020 | Rigiroli |
| 2020/0302760 A1 | 9/2020 | Carter |
| 2020/0320347 A1 | 10/2020 | Nikolenko |
| 2020/0327418 A1 | 10/2020 | Lyons |
| 2020/0380832 A1 | 12/2020 | Carter |
| 2021/0037332 A1 | 2/2021 | Kappus |
| 2021/0043070 A1 | 2/2021 | Carter |
| 2021/0056693 A1 | 2/2021 | Cheng |
| 2021/0109712 A1 | 4/2021 | Oliver |
| 2021/0111731 A1 | 4/2021 | Oliver |
| 2021/0112353 A1 | 4/2021 | Brian |
| 2021/0141458 A1 | 5/2021 | Sarafianou |
| 2021/0165491 A1 | 6/2021 | Sun |
| 2021/0170447 A1 | 6/2021 | Buckland |
| 2021/0183215 A1 | 6/2021 | Carter |
| 2021/0201884 A1 | 7/2021 | Kappus |
| 2021/0225355 A1 | 7/2021 | Long |
| 2021/0303072 A1 | 9/2021 | Carter |
| 2021/0303758 A1 | 9/2021 | Long |
| 2021/0334706 A1 | 10/2021 | Yamaguchi |
| 2021/0381765 A1 | 12/2021 | Kappus |
| 2021/0397261 A1 | 12/2021 | Kappus |
| 2022/0035479 A1 | 2/2022 | Lasater |
| 2022/0095068 A1 | 3/2022 | Kappus |
| 2022/0113806 A1 | 4/2022 | Long |
| 2022/0155949 A1 | 5/2022 | Ring |
| 2022/0198892 A1 | 6/2022 | Carter |
| 2022/0236806 A1 | 7/2022 | Carter |
| 2022/0252550 A1 | 8/2022 | Catsis |
| 2022/0300028 A1 | 9/2022 | Long |
| 2022/0300070 A1 | 9/2022 | Iodice |
| 2022/0329250 A1 | 10/2022 | Long |
| 2022/0393095 A1 | 12/2022 | Chilles |
| 2023/0036123 A1 | 2/2023 | Long |
| 2023/0075917 A1 | 3/2023 | Pittera |
| 2023/0117919 A1 | 4/2023 | Iodice |
| 2023/0124704 A1 | 4/2023 | Rorke |
| 2023/0141896 A1 | 5/2023 | Liu |
| 2023/0168228 A1 | 6/2023 | Brian |
| 2023/0215248 A1 | 7/2023 | Lowther |
| 2023/0228857 A1 | 7/2023 | Carter |
| 2023/0251720 A1 | 8/2023 | William |
| 2023/0259213 A1 | 8/2023 | Long |

FOREIGN PATENT DOCUMENTS

| | | |
|---|---|---|
| CN | 101986787 | 3/2011 |
| CN | 102459900 | 5/2012 |
| CN | 102591512 | 7/2012 |
| CN | 103797379 | 5/2014 |
| CN | 103984414 A | 8/2014 |
| CN | 107340871 A | 11/2017 |
| CN | 107407969 A | 11/2017 |
| CN | 107534810 A | 1/2018 |
| EP | 0057594 A2 | 8/1982 |
| EP | 309003 | 3/1989 |
| EP | 0696670 A1 | 2/1996 |
| EP | 1875081 A1 | 1/2008 |
| EP | 1911530 | 4/2008 |
| EP | 2271129 A1 | 1/2011 |
| EP | 1461598 B1 | 4/2014 |
| EP | 3207817 A1 | 8/2017 |
| EP | 3216231 B1 | 8/2019 |
| EP | 3916525 | 12/2021 |
| GB | 2464117 | 4/2010 |
| GB | 2513884 | 11/2014 |
| GB | 2513884 A | 11/2014 |
| GB | 2530036 | 3/2016 |
| JP | 2008074075 | 4/2008 |
| JP | 2010109579 | 5/2010 |
| JP | 2011172074 | 9/2011 |
| JP | 2012048378 | 3/2012 |
| JP | 2012048378 A | 3/2012 |
| JP | 5477736 B2 | 4/2014 |
| JP | 2015035657 A | 2/2015 |
| JP | 2016035646 | 3/2016 |
| JP | 2017168086 | 9/2017 |
| JP | 6239796 | 11/2017 |
| KR | 20120065779 | 6/2012 |
| KR | 20130055972 | 5/2013 |
| KR | 1020130055972 | 5/2013 |
| KR | 20160008280 | 1/2016 |
| KR | 20200082449 A | 7/2020 |
| WO | 9118486 | 11/1991 |
| WO | 9639754 | 12/1996 |
| WO | 03050511 A | 6/2003 |
| WO | 2005017965 | 2/2005 |
| WO | 2007144801 A2 | 12/2007 |
| WO | 2009071746 A1 | 6/2009 |
| WO | 2009112866 | 9/2009 |
| WO | 2010003836 | 1/2010 |
| WO | 2010139916 | 12/2010 |
| WO | 2011132012 A1 | 10/2011 |
| WO | 2012023864 | 2/2012 |
| WO | 2012104648 A1 | 8/2012 |
| WO | 2013179179 | 12/2013 |
| WO | 2014181084 | 11/2014 |
| WO | 2015006467 | 1/2015 |
| WO | 2015039622 | 3/2015 |
| WO | 2015127335 | 8/2015 |
| WO | 2015194510 | 12/2015 |
| WO | 2016007920 | 1/2016 |
| WO | 2016073936 | 5/2016 |
| WO | 2016095033 A1 | 6/2016 |
| WO | 2016099279 | 6/2016 |
| WO | 2016132141 | 8/2016 |
| WO | 2016132144 | 8/2016 |
| WO | 2016137675 | 9/2016 |
| WO | 2016162058 | 10/2016 |
| WO | 2017172006 | 10/2017 |
| WO | 2018109466 A1 | 6/2018 |
| WO | 2020049321 A2 | 3/2020 |
| WO | 2021130505 A1 | 7/2021 |
| WO | 2021260373 A1 | 12/2021 |

OTHER PUBLICATIONS

Almusawi et al., "A new artificial neural network approach in solving inverse kinematics of robotic arm (denso vp6242)." Computational intelligence and neuroscience 2016 (2016). (Year: 2016).

Azad et al., Deep domain adaptation under deep label scarcity. arXiv preprint arXiv: 1809.08097 (2018) (Year: 2018).

Beranek, L., & Mellow, T. (2019). Acoustics: Sound Fields, Transducers and Vibration. Academic Press.

Boureau et al.,"A theoretical analysis of feature pooling in visual recognition." In Proceedings of the 27th international conference on machine learning (ICML-10), pp. 111-118. 2010. (Year: 2010).

Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.

Certon, D., Felix, N., Hue, P. T. H., Patat, F., & Lethiecq, M. (Oct. 1999). Evaluation of laser probe performances for measuring cross-coupling in 1-3 piezocomposite arrays. In 1999 IEEE Ultrasonics Symposium. Proceedings. International Symposium (Cat. No. 99CH37027) (vol. 2, pp. 1091-1094).

Certon, D., Felix, N., Lacaze, E., Teston, F., & Patat, F. (2001). Investigation of cross-coupling in 1-3 piezocomposite arrays. ieee transactions on ultrasonics, ferroelectrics, and frequency control, 48(1), 85-92.

Chang Suk Lee et al., An electrically switchable visible to infra-red dual frequency cholesteric liquid crystal light shutter. J. Mater. Chem. C, 2018, 6, 4243 (7 pages).

(56) References Cited

OTHER PUBLICATIONS

Der et al., Inverse kinematics for reduced deformable models. ACM Transactions on graphics (TOG) 25, No. 3 (2006): 1174-1179. (Year: 2006).

DeSilets, C. S. (1978). Transducer arrays suitable for acoustic imaging (No. GL-2833). Stanford Univ CA Edward L Ginzton Lab of Physics.

Duka, "Neural network based inverse kinematics solution for trajectory tracking of a robotic arm." Procedia Technology 12 (2014) 20-27. (Year: 2014).

Henneberg, J., Gerlach, A., Storck, H., Cebulla, H., & Marburg, S. (2018). Reducing mechanical cross-coupling in phased array transducers using stop band material as backing. Journal of Sound and Vibration, 424, 352-364.

https://radiopaedia.org/articles/physical-principles-of-ultrasound-1?lang=GB (Accessed May 29, 2022).

Office Action (Non-Final Rejection) dated May 25, 2022 for U.S. Appl. No. 16/843,281 (pp. 1-28).

Office Action (Non-Final Rejection) dated Jun. 9, 2022 for U.S. Appl. No. 17/080,840 (pp. 1-9).

Office Action (Non-Final Rejection) dated Jun. 27, 2022 for U.S. Appl. No. 16/198,959 (pp. 1-17).

Office Action (Non-Final Rejection) dated Jun. 27, 2022 for U.S. Appl. No. 16/734,479 (pp. 1-13).

Oikonomidis et al., "Efficient model-based 3D tracking of hand articulations using Kinect." In BmVC, vol. 1, No. 2, p. 3. 2011. (Year: 2011).

Patricio Rodrigues, E., Francisco de Oliveira, T., Yassunori Matuda, M., & Buiochi, F. (Sep. 2019). Design and Construction of a 2-D Phased Array Ultrasonic Transducer for Coupling in Water. In INTER-NOISE and NOISE-CON Congress and Conference Proceedings (vol. 259, No. 4, pp. 5720-5731). Institute of Noise Control Engineering.

Seo et al., "Improved numerical inverse kinematics for human pose estimation," Opt. Eng. 50(3 037001 (Mar. 1, 2011) https:// doi.org/10.1117/1.3549255 (Year: 2011).

Walter, S., Nieweglowski, K., Rebenklau, L., Wolter, K. J., Lamek, B., Schubert, F., . . . & Meyendorf, N. (May 2008). Manufacturing and electrical interconnection of piezoelectric 1-3 composite materials for phased array ultrasonic transducers. In 2008 31st International Spring Seminar on Electronics Technology (pp. 255-260).

Wang et al., Few-shot adaptive faster r-cnn. In Proceedings of the IEEE/CVF Conference on Computer Vision and Pattern Recognition, pp. 7173-7182. 2019. (Year: 2019).

Al-Mashhadany, "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages. (Year: 2010).

Guez, "Solution to the inverse kinematic problem in robotics by neural networks." In Proceedings of the 2nd International Conference on Neural Networks, 1988. San Diego, California. (Year: 1988) 8 pages.

Invitation to Pay Additional Fees for PCT/GB2022/051821 (dated Oct. 20, 2022), 15 pages.

Mahboob, "Artificial neural networks for learning inverse kinematics of humanoid robot arms." MS Thesis, 2015. (Year: 2015) 95 pages.

Office Action (Ex Parte Quayle Action) dated Jan. 6, 2023 for U.S. Appl. No. 17/195,795 (pp. 1-6).

Office Action (Final Rejection) dated Jan. 9, 2023 for U.S. Appl. No. 16/144,474 (pp. 1-16).

Office Action (Final Rejection) dated Nov. 18, 2022 for U.S. Appl. No. 16/228,767 (pp. 1-27).

Office Action (Final Rejection) dated Nov. 18, 2022 for U.S. Appl. No. 17/068,831 (pp. 1-9).

Office Action (Final Rejection) dated Dec. 8, 2022 for U.S. Appl. No. 16/229,091 (pp. 1-9).

Office Action (Final Rejection) dated Dec. 15, 2022 for U.S. Appl. No. 16/843,281 (pp. 1-25).

Office Action (Non-Final Rejection) dated Oct. 17, 2022 for U.S. Appl. No. 17/807,730 (pp. 1-8).

Office Action (Non-Final Rejection) dated Nov. 9, 2022 for U.S. Appl. No. 17/454,823 (pp. 1-16).

Office Action (Non-Final Rejection) dated Nov. 16, 2022 for U.S. Appl. No. 17/134,505 (pp. 1-7).

Office Action (Non-Final Rejection) dated Nov. 16, 2022 for U.S. Appl. No. 17/692,852 (pp. 1-4).

Office Action (Non-Final Rejection) dated Dec. 6, 2022 for U.S. Appl. No. 17/409,783 (pp. 1-7).

Office Action (Non-Final Rejection) dated Dec. 22, 2022 for U.S. Appl. No. 17/457,663 (pp. 1-20).

Office Action (Notice of Allowance and Fees Due (PTOL-85)) dated Oct. 31, 2022 for U.S. Appl. No. 17/068,834 (pp. 1-2).

Office Action (Notice of Allowance and Fees Due (PTOL-85)) dated Oct. 31, 2022 for U.S. Appl. No. 17/176,899 (pp. 1-2).

Office Action (Notice of Allowance and Fees Due (PTOL-85)) dated Nov. 1, 2022 for U.S. Appl. No. 16/404,660 (pp. 1-5).

Office Action (Notice of Allowance and Fees Due (PTOL-85)) dated Nov. 2, 2022 for U.S. Appl. No. 16/734,479 (pp. 1-2).

Office Action (Notice of Allowance and Fees Due (PTOL-85)) dated Nov. 10, 2022 for U.S. Appl. No. 16/198,959 (pp. 1-2).

Office Action (Notice of Allowance and Fees Due (PTOL-85)) dated Nov. 16, 2022 for U.S. Appl. No. 16/404,660 (pp. 1-2).

"Welcome to Project Soli" video, https://atap.google.com/#project-soli Accessed Nov. 30, 2018, 2 pages.

A. B. Vallbo, Receptive field characteristics of tactile units with myelinated afferents in hairy skin of human subjects, Journal of Physiology (1995), 483.3, pp. 783-795.

A. Sand, Head-Mounted Display with Mid-Air Tactile Feedback, Proceedings of the 21st ACM Symposium on Virtual Reality Software and Technology, Nov. 13-15, 2015 (8 pages).

Alexander, J. et al. (2011), Adding Haptic Feedback to Mobile TV (6 pages).

Amanda Zimmerman, The gentle touch receptors of mammalian skin, Science, Nov. 21, 2014, vol. 346 Issue 6212, p. 950.

Aoki et al., Sound location of stero reproduction with parametric loudspeakers, Applied Acoustics 73 (2012) 1289-1295 (7 pages).

Ashish Shrivastava et al., Learning from Simulated and Unsupervised Images through Adversarial Training, Jul. 19, 2017, pp. 1-16.

Bajard et al., Bkm: A New Hardware Algorithm for Complex Elementary Functions, 8092 IEEE Transactions on Computers 43 (1994) (9 pages).

Bajard et al., Evaluation of Complex Elementary Functions / A New Version of BKM, SPIE Conference on Advanced Signal Processing, Jul. 1999 (8 pages).

Benjamin Long et al., "Rendering volumetric haptic shapes in mid-air using ultrasound", Acm Transactions On Graphics (TPG), ACM, US, (20141119), vol. 33, No. 6, ISSN 0730-0301, pp. 1-10.

Bortoff et al., Pseudolinearization of the Acrobot using Spline Functions, IEEE Proceedings of the 31st Conference on Decision and Control, Sep. 10, 1992 (6 pages).

Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.

Brian Kappus and Ben Long, Spatiotemporal Modulation for Mid-Air Haptic Feedback from an Ultrasonic Phased Array, ICSV25, Hiroshima, Jul. 8-12, 2018, 6 pages.

Canada Application 2,909,804 Office Action dated Oct. 18, 2019, 4 pages.

Casper et al., Realtime Control of Multiple-focus Phased Array Heating Patterns Based on Noninvasive Ultrasound Thermography, IEEE Trans Biomed Eng. Jan. 2012; 59(1): 95-105.

Christoper M. Bishop, Pattern Recognition and Machine Learning, 2006, pp. 1-758.

Colgan, A., "How Does the Leap Motion Controller Work?" Leap Motion, Aug. 9, 2014, 10 pages.

Corrected Notice of Allowability dated Aug. 9, 2021 for U.S. Appl. No. 15/396,851 (pp. 1-6).

Corrected Notice of Allowability dated Jan. 14, 2021 for U.S. Appl. No. 15/897,804 (pp. 1-2).

(56) References Cited

OTHER PUBLICATIONS

Corrected Notice of Allowability dated Jun. 21, 2019 for U.S. Appl. No. 15/966,213 (2 pages).
Corrected Notice of Allowability dated Oct. 31, 2019 for U.S. Appl. No. 15/623,516 (pp. 1-2).
Damn Geeky, "Virtual projection keyboard technology with haptic feedback on palm of your hand," May 30, 2013, 4 pages.
David Joseph Tan et al., Fits like a Glove: Rapid and Reliable Hand Shape Personalization, 2016 IEEE Conference on Computer Vision and Pattern Recognition, pp. 5610-5619.
Definition of "Interferometry"according to Wikipedia, 25 pages., Retrieved Nov. 2018.
Definition of "Multilateration" according to Wikipedia, 7 pages., Retrieved Nov. 2018.
Definition of "Trilateration"according to Wikipedia, 2 pages., Retrieved Nov. 2018.
Diederik P. Kingma et al., Adam: A Method for Stochastic Optimization, Jan. 30, 2017, pp. 1-15.
E. Bok, Metasurface for Water-to-Air Sound Transmission, Physical Review Letters 120, 044302 (2018) (6 pages).
E.S. Ebbini et al. (1991), A spherical-section ultrasound phased array applicator for deep localized hyperthermia, Biomedical Engineering, IEEE Transactions on (vol. 38 Issue: 7), pp. 634-643.
EPO Office Action for EP16708440.9 dated Sep. 12, 2018 (7 pages).
EPSRC Grant summary EP/J004448/1 (2011) (1 page).
Eric Tzeng et al., Adversarial Discriminative Domain Adaptation, Feb. 17, 2017, pp. 1-10.
European Office Action for Application No. EP16750992.6, dated Oct. 2, 2019, 3 pages.
Ex Parte Quayle Action dated Dec. 28, 2018 for U.S. Appl. No. 15/966,213 (pp. 1-7).
Extended European Search Report for Application No. EP19169929.7, dated Aug. 6, 2019, 7 pages.
Freeman et al., Tactile Feedback for Above-Device Gesture Interfaces: Adding Touch to Touchless Interactions ICMI'14, Nov. 12-16, 2014, Istanbul, Turkey (8 pages).
Gavrilov L R et al.(2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Henrik Bruus, Acoustofluidics 2: Perturbation theory and ultrasound resonance modes, Lab Chip, 2012, 12, 20-28.
Hilleges et al. Interactions in the air: adding further depth to interactive tabletops, UIST '09: Proceedings of the 22nd annual ACM symposium on User interface software and technologyOct. 2009 pp. 139-148.
Hoshi et al., Tactile Presentation by Airborne Ultrasonic Oscillator Array, Proceedings of Robotics and Mechatronics Lecture 2009, Japan Society of Mechanical Engineers; May 24, 2009 (5 pages).
Hoshi T et al., "Noncontact Tactile Display Based on Radiation Pressure of Airborne Ultrasound", IEEE Transactions On Haptics, IEEE, USA, (Jul. 1, 2010), vol. 3, No. 3, ISSN 1939-1412, pp. 155-165.
Hoshi, T., Development of Aerial-Input and Aerial-Tactile-Feedback System, IEEE World Haptics Conference 2011, p. 569-573.
Hoshi, T., Handwriting Transmission System Using Noncontact Tactile Display, IEEE Haptics Symposium 2012 pp. 399-401.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Hoshi, T., Touchable Holography, SIGGRAPH 2009, New Orleans, Louisiana, Aug. 3-7, 2009. (1 page).
Hua J, Qin H., Haptics-based dynamic implicit solid modeling, IEEE Trans Vis Comput Graph. Sep.-Oct. 2004;10(5):574-86.
Hyunjae Gil, Whiskers: Exploring the Use of Ultrasonic Haptic Cues on the Face, CHI 2018, Apr. 21- 26, 2018, Montréal, QC, Canada.
Iddan, et al., "3D Imaging in the Studio (And Elsewhwere . . . " Apr. 2001, 3DV systems Ltd., Yokneam, Isreal, www.3dvsystems.com.il, 9 pages.
Imaginary Phone: Learning Imaginary Interfaces By Transferring Spatial Memory From a Familiar Device Sean Gustafson, Christian Holz and Patrick Baudisch. UIST 2011. (10 pages).
India Morrison, The skin as a social organ, Exp Brain Res (2010) 204:305-314.
International Preliminary Report on Patentability and Written Opinion issued in corresponding PCT/ US2017/035009, dated Dec. 4, 2018, 8 pages.
International Preliminary Report on Patentability for Application No. PCT/EP2017/069569 dated Feb. 5, 2019, 11 pages.
International Search Report and Written Opinion for Application No. PCT/GB2018/053738, dated Apr. 11, 2019, 14 pages.
International Search Report and Written Opinion for Application No. PCT/GB2018/053739, dated Jun. 4, 2019, 16 pages.
International Search Report and Written Opinion for Application No. PCT/GB2019/050969, dated Jun. 13, 2019, 15 pages.
International Search Report and Written Opinion for Application No. PCT/GB2019/051223, dated Aug. 8, 2019, 15 pages.
International Search Report and Written Opinion for Application No. PCT/GB2019/052510, dated Jan. 14, 2020, 25 pages.
ISR & WO for PCT/GB2020/052545 (dated Jan. 27, 2021) 14 pages.
ISR and WO for PCT/GB2020/050013 (dated Jul. 13, 2020) (20 pages).
ISR and WO for PCT/GB2020/050926 (dated Jun. 2, 2020) (16 pages).
ISR and WO for PCT/GB2020/052544 (dated Dec. 18, 2020) (14 pages).
ISR for PCT/GB2020/052546 (dated Feb. 23, 2021) (14 pages).
ISR for PCT/GB2020/053373 (dated Mar. 26, 2021) (16 pages).
Iwamoto et al. (2008), Non-contact Method for Producing Tactile Sensation Using Airborne Ultrasound, EuroHaptics, pp. 504-513.
Iwamoto et al., Airborne Ultrasound Tactile Display: Supplement, The University of Tokyo 2008 (2 pages).
Iwamoto T et al., "Two-dimensional Scanning Tactile Display using Ultrasound Radiation Pressure", Haptic Interfaces for Virtual Environment and Teleoperator Systems, 2006 14th Symposium On Alexandria, VA, USA Mar. 25-26, 2006, Piscataway, NJ, USA, IEEE, (20060325), ISBN 978-1-4244-0226-7, pp. 57-61.
Jager et al., "Air-Coupled 40-KHZ Ultrasonic 2D-Phased Array Based on a 3D-Printed Waveguide Structure", 2017 IEEE, 4 pages.
Japanese Office Action (with English language translation) for Application No. 2017-514569, dated Mar. 31, 2019, 10 pages.
JonasChatel-Goldman, Touch increases autonomic coupling between romantic partners, Frontiers in Behavioral Neuroscience Mar. 2014, vol. 8, Article 95.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.

(56) References Cited

OTHER PUBLICATIONS

Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Jonathan Tompson et al., Real-Time Continuous Pose Recovery of Human Hands Using Convolutional Networks, ACM Trans. Graph. 33, 5, Article 169, Aug. 2014, pp. 1-10.
K. Jia, Dynamic properties of micro-particles in ultrasonic transportation using phase-controlled standing waves, J. Applied Physics 116, n. 16 (2014) (12 pages).
Kai Tsumoto, Presentation of Tactile Pleasantness Using Airborne Ultrasound, 2021 IEEE World Haptics Conference (WHC) Jul. 6-9, 2021. Montreal, Canada.
Kaiming He et al., Deep Residual Learning for Image Recognition, http://image-net.org/challenges/ LSVRC/2015/ and http://mscoco.org/dataset/#detections-challenge2015, Dec. 10, 2015, pp. 1-12.
Kamakura, T. and Aoki, K. (2006) "A Highly Directional Audio System using a Parametric Array in Air" WESPAC IX 2006 (8 pages).
Keisuke Hasegawa, Electronically steerable ultrasound-driven long narrow air stream, Applied Physics Letters 111, 064104 (2017).
Keisuke Hasegawa, Midair Ultrasound Fragrance Rendering, IEEE Transactions On Visualization and Computer Graphics, vol. 24, No. 4, Apr. 2018 1477.
Keisuke Hasegawa,,Curved acceleration path of ultrasound-driven air flow, J. Appl. Phys. 125, 054902 (2019).
Kolb, et al., "Time-of-Flight Cameras in Computer Graphics," Computer Graphics forum, vol. 29 (2010), No. 1, pp. 141-159.
Konstantinos Bousmalis et al., Domain Separation Networks, 29th Conference on Neural Information Processing Systems (NIPS 2016), Barcelona, Spain. Aug. 22, 2016, pp. 1-15.
Krim, et al., "Two Decades of Array Signal Processing Research—The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCD-Technology", A dissertation submitted to Department of EE and CS at Univ. of Siegen, dated Jun. 28, 2000, 223 pages.
Large et al.,Feel the noise: Mid-air ultrasound haptics as a novel human-vehicle interaction paradigm, Applied Ergonomics (2019) (10 pages).
Li, Larry, "Time-of-Flight Camera—An Introduction," Texas Instruments, Technical White Paper, SLOA190B—Jan. 2014 Revised May 2014, 10 pages.
Light, E.D., Progress in Two Dimensional Arrays for Real Time Volumetric Imaging, 1998 (17 pages).
Line S Loken, Coding of pleasant touch by unmyelinated afferents in humans, Nature Neuroscience vol. 12 [ No. 5 [ May 2009 547.
M. Barmatz et al, "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Mahdi Rad et al., Feature Mapping for Learning Fast and Accurate 3D Pose Inference from Synthetic Images, Mar. 26, 2018, pp. 1-14.
Marco A B Andrade et al., "Matrix method for acoustic levitation simulation", IEEE Transactions On Ultrasonics, Ferroelectrics and Frequency Control, IEEE, US, (Aug. 1, 2011), vol. 58, No. 8, ISSN 0885-3010, pp. 1674-1683.
Mariana von Mohr, The soothing function of touch: affective touch reduces feelings of social exclusion, Scientific Reports, 7: 13516, Oct. 18, 2017.
Marin, About LibHand, LibHand—A Hand Articulation Library, www.libhand.org/index.html, Mar. 26, 2020, pp. 1-2; www.libhand.org/download.html, 1 page; www.libhand.org/examples.html, pp. 1-2.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Marzo et al., Holographic acoustic elements for manipulation of levitated objects, Nature Communications Doi: 10.1038/ncomms9661 (2015) (7 pages).
Meijster, A., et al., "A General Algorithm for Computing Distance Transforms in Linear Time," Mathematical Morphology and its Applications to Image and Signal Processing, 2002, pp. 331-340.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018.
Mueller, GANerated Hands for Real-Time 3D Hand Tracking from Monocular RGB, Eye in-Painting with Exemplar Generative Adverserial Networks, pp. 49-59 (Jun. 1, 2018).
Nina Gaissert, Christian Wallraven, and Heinrich H. Bulthoff, "Visual and Haptic Perceptual Spaces Show High Similarity in Humans ", published to Journal of Vision in 2010, available at http://www.journalofvision.org/content/10/11/2 and retrieved on Apr. 22, 2020 ( Year: 2010), 20 pages.
Notice of Allowance dated Apr. 20, 2021 for U.S. Appl. No. 16/563,608 (pp. 1-5).
Notice of Allowance dated Apr. 22, 2020 for U.S. Appl. No. 15/671,107 (pp. 1-5).
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Notice of Allowance dated Feb. 10, 2020, for U.S. Appl. No. 16/160,862 (pp. 1-9).
Notice of Allowance dated Feb. 7, 2019 for U.S. Appl. No. 15/851,214 (pp. 1-7).
Notice of Allowance dated Jul. 22, 2021 for U.S. Appl. No. 16/600,500 (pp. 1-9).
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Notice of Allowance dated Jun. 10, 2021 for U.S. Appl. No. 17/092,333 (pp. 1-9).
Notice of Allowance dated Jun. 17, 2020 for U.S. Appl. No. 15/210,661 (pp. 1-9).
Notice of Allowance dated Jun. 25, 2021 for U.S. Appl. No. 15/396,851 (pp. 1-10).
Notice of Allowance dated May 30, 2019 for U.S. Appl. No. 15/966,213 (pp. 1-9).
Notice of Allowance dated Oct. 1, 2020 for U.S. Appl. No. 15/897,804 (pp. 1-9).
Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Notice of Allowance in U.S. Appl. No. 15/210,661 dated Jun. 17, 2020 (22 pages).
Obrist et al., Emotions Mediated Through Mid-Air Haptics, CHI 2015, Apr. 18-23, 2015, Seoul, Republic of Korea. (10 pages).
Obrist et al., Talking about Tactile Experiences, CHI 2013, Apr. 27-May 2, 2013 (10 pages).

(56) References Cited

OTHER PUBLICATIONS

Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for U.S. Appl. No. 16/401,148 (pp. 1-15).
Office Action dated Apr. 18, 2019 for U.S. Appl. No. 16/296,127 (pp. 1-6).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Office Action dated Apr. 4, 2019 for U.S. Appl. No. 15/897,804 (pp. 1-10).
Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 22, 2019 for U.S. Appl. No. 16/160,862 (pp. 1-5).
Office Action dated Aug. 9, 2021 for U.S. Appl. No. 17/068,825 (pp. 1-9).
Office Action dated Dec. 11, 2019 for U.S. Appl. No. 15/959,266 (pp. 1-15).
Office Action dated Dec. 7, 2020 for U.S. Appl. No. 16/563,608 (pp. 1-8).
Office Action dated Feb. 20, 2019 for U.S. Appl. No. 15/623,516 (pp. 1-8).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Jun. 25, 2021 for U.S. Appl. No. 16/899,720 (pp. 1-5).
Office Action dated Mar. 11, 2021 for U.S. Appl. No. 16/228,767 (pp. 1-23).
Office Action dated Mar. 20, 2020 for U.S. Appl. No. 15/210,661 (pp. 1-10).
Office Action dated Mar. 31, 2021 for U.S. Appl. No. 16/228,760 (pp. 1-21).
Office Action dated May 13, 2021 for U.S. Appl. No. 16/600,500 (pp. 1-9).
Office Action dated May 14, 2021 for U.S. Appl. No. 16/198,959 (pp. 1-6).
Office Action dated May 16, 2019 for U.S. Appl. No. 15/396,851 (pp. 1-7).
Office Action dated May 18, 2020 for U.S. Appl. No. 15/960,113 (pp. 1-21).
Office Action dated Oct. 17, 2019 for U.S. Appl. No. 15/897,804 (pp. 1-10).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Office Action dated Sep. 16, 2021 for U.S. Appl. No. 16/600,496 (pp. 1-8).
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
Office Action dated Sep. 24, 2021 for U.S. Appl. No. 17/080,840 (pp. 1-9).
OGRECave/ogre—GitHub: ogre/Samples/Media/materials at 7de80a7483f20b50f2b10d7ac6de9d9c6c87d364, Mar. 26, 2020, 1 page.
Optimal regularisation for acoustic source reconstruction by inverse methods, Y. Kim, P.A. Nelson, Institute of Sound and Vibration Research, University of Southampton, Southampton, SO17 1BJ, UK Received Feb. 25, 2003; 25 pages.
Oscar Martínez-Graullera et al., "2D array design based on Fermat spiral for ultrasound imaging", ULTRASONICS, (Feb. 1, 2010), vol. 50, No. 2, ISSN 0041-624X, pp. 280-289, XP055210119.
Partial International Search Report for Application No. PCT/GB2018/053735, dated Apr. 12, 2019, 14 pages.
Partial ISR for Application No. PCT/GB2020/050013 dated May 19, 2020 (16 pages).
PCT Partial International Search Report for Application No. PCT/GB2018/053404 dated Feb. 25, 2019, 13 pages.
Péter Tamás Kovács et al., "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Phys.org, Touchable Hologram Becomes Reality, Aug. 6, 2009, by Lisa Zyga (2 pages).
Pompei, F.J. (2002), "Sound from Ultrasound: The Parametric Array as an Audible Sound Source", Massachusetts Institute of Technology (132 pages).
Rocchesso et al., Accessing and Selecting Menu Items by In-Air Touch, ACM CHItaly'19, Sep. 23-25, 2019, Padova, Italy (9 pages).
Rochelle Ackerley, Human C-Tactile Afferents Are Tuned to the Temperature of a Skin-Stroking Caress, J. Neurosci., Feb. 19, 2014, 34(8):2879-2883.
Ryoko Takahashi, Tactile Stimulation by Repetitive Lateral Movement of Midair Ultrasound Focus, Journal of Latex Class Files, vol. 14, No. 8, Aug. 2015.
Schmidt, Ralph, "Multiple Emitter Location and Signal Parameter Estimation" IEEE Transactions of Antenna and Propagation, vol. AP-34, No. 3, Mar. 1986, pp. 276-280.
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Search Report by EPO for EP 17748466 dated Jan. 13, 2021 (16 pages).
Search Report for GB1308274.8 dated Nov. 11, 2013. (2 pages).
Search Report for GB1415923.0 dated Mar. 11, 2015. (1 page).
Search Report for PCT/GB/2017/053729 dated Mar. 15, 2018 (16 pages).
Search Report for PCT/GB/2017/053880 dated Mar. 21, 2018. (13 pages).
Search report for PCT/GB2014/051319 dated Dec. 8, 2014 (4 pages).
Search report for PCT/GB2015/052507 dated Mar. 11, 2020 (19 pages).
Search report for PCT/GB2015/052578 dated Oct. 26, 2015 (12 pages).
Search report for PCT/GB2015/052916 dated Feb. 26, 2020 (18 pages).
Search Report for PCT/GB2017/052332 dated Oct. 10, 2017 (12 pages).

(56) References Cited

OTHER PUBLICATIONS

Search report for PCT/GB2018/051061 dated Sep. 26, 2018 (17 pages).
Search report for PCT/US2018/028966 dated Jul. 13, 2018 (43 pages).
Sergey Ioffe et al., Batch Normalization: Accelerating Deep Network Training by Reducing Internal Covariat Shift, Mar. 2, 2015, pp. 1-11.
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Shanxin Yuan et al., BigHand2.2M Bechmark: Hand Pose Dataset and State of the Art Analysis, Dec. 9, 2017, pp. 1-9.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Sixth Sense webpage, http://www.pranavmistry.com/projects/sixthsense/ Accessed Nov. 30, 2018, 7 pages.
Stan Melax et al., Dynamics Based 3D Skeletal Hand Tracking, May 22, 2017, pp. 1-8.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, PHYSIOLOGY 28: 142-150, 2013.
Steve Guest et al., "Audiotactile interactions in roughness perception", Exp. Brain Res (2002) 146:161-171, DOI 10.1007/s00221-002-1164-z, Received: Feb. 9, 2002/Accepted: May 16, 2002/Published online: Jul. 26, 2002, Springer-Verlag 2002, (11 pages).
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Sylvia Gebhardt, Ultrasonic Transducer Arrays for Particle Manipulation (date unknown) (2 pages).
Takaaki Kamigaki, Noncontact Thermal and Vibrotactile Display Using Focused Airborne Ultrasound, EuroHaptics 2020, LNCS 12272, pp. 271-278, 2020.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
Takahashi, M. et al., Large Aperture Airborne Ultrasound Tactile Display Using Distributed Array Units, SICE Annual Conference 2010 p. 359-62.
Takayuki et al., "Noncontact Tactile Display Based on Radiation Pressure of Airborne Ultrasound" IEEE Transactions on Haptics vol. 3, No. 3, p. 165 (2010).
Teixeira, et al., "A brief introduction to Microsoft's Kinect Sensor," Kinect, 26 pages, retrieved Nov. 2018.
Toby Sharp et al., Accurate, Robust, and Flexible Real-time Hand Tracking, CHI '15, Apr. 18-23, 2015, Seoul, Republic of Korea, ACM 978-1-4503-3145-6/15/04, pp. 1-10.
Tom Carter et al, "UltraHaptics: Multi-Point Mid-Air Haptic Feedback for Touch Surfaces", Proceedings of the 26th Annual ACM Symposium On User Interface Software and Technology, UIST '13, New York, New York, USA, (Jan. 1, 2013), ISBN 978-1-45-032268-3, pp. 505-514.
Tom Nelligan and Dan Kass, Intro to Ultrasonic Phased Array (date unknown) (8 pages).
Tomoo Kamakura, Acoustic streaming induced in focused Gaussian beams, J. Acoust. Soc. Am. 97 (5), Pt. 1, May 1995 p. 2740.

Uta Sailer, How Sensory and Affective Attributes Describe Touch Targeting C-Tactile Fibers, Experimental Psychology (2020), 67(4), 224-236.
Vincent Lepetit et al., Model Based Augmentation and Testing of an Annotated Hand Pose Dataset, ResearchGate, https://www.researchgate.net/publication/307910344, Sep. 2016, 13 pages.
Wang et al., Device-Free Gesture Tracking Using Acoustic Signals, ACM MobiCom '16, pp. 82-94 (13 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Wooh et al., "Optimum beam steering of linear phased arays," Wave Motion 29 (1999) pp. 245-265, 21 pages.
Xin Cheng et al., "Computation of the acoustic radiation force on a sphere based on the 3-D FDTD method", Piezoelectricity, Acoustic Waves and Device Applications (SPAWDA), 2010 Symposium On, IEEE, (Dec. 10, 2010), ISBN 978-1-4244-9822-2, pp. 236-239.
Xu Hongyi et al, "6-DoF Haptic Rendering Using Continuous Collision Detection between Points and Signed Distance Fields", IEEE Transactions On Haptics, IEEE, USA, vol. 10, No. 2, ISSN 1939-1412, (Sep. 27, 2016), pp. 151-161, (Jun. 16, 2017).
Yang Ling et al., "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the author(s), 11 pages.
Yoshino, K. and Shinoda, H. (2013), "Visio Acoustic Screen for Contactless Touch Interface with Tactile Sensation", University of Tokyo (5 pages).
Zeng, Wejun, "Microsoft Kinect Sensor and Its Effect," IEEE Multimedia, Apr.-Jun. 2012, 7 pages.
ISR & WO for PCT/GB2022/051388 (dated Aug. 30, 2022) (15 pages).
Office Action (Final Rejection) dated Sep. 16, 2022 for U.S. Appl. No. 16/404,660 (pp. 1-6).
Office Action (Non-Final Rejection) dated Aug. 29, 2022 for U.S. Appl. No. 16/995,819 (pp. 1-6).
Office Action (Non-Final Rejection) dated Sep. 21, 2022 for U.S. Appl. No. 17/721,315 (pp. 1-10).
Office Action (Notice of Allowance and Fees Due (PTOL-85)) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Notice of Allowance and Fees Due (PTOL-85)) dated Sep. 7, 2022 for U.S. Appl. No. 17/068,834 (pp. 1-8).
Office Action (Notice of Allowance and Fees Due (PTOL-85)) dated Sep. 8, 2022 for U.S. Appl. No. 17/176,899 (pp. 1-8).
Office Action (Notice of Allowance and Fees Due (PTOL-85)) dated Sep. 12, 2022 for U.S. Appl. No. 16/734,479 (pp. 1-7).
EPO Examination Search Report 17 702 910.5 (dated Jun. 23, 2021).
Office Action dated Oct. 29, 2021 for U.S. Appl. No. 16/198,959 (pp. 1-7).
Notice of Allowance dated Nov. 5, 2021 for U.S. Appl. No. 16/899,720 (pp. 1-9).
Corrected Notice of Allowability dated Nov. 24, 2021 for U.S. Appl. No. 16/600,500 (pp. 1-5).
International Search Report and Written Opinion for App. No. PCT/GB2021/051590, dated Nov. 11, 2021, 20 pages.
Anonymous: "How does Ultrahaptics technology work?— Ultrahaptics Developer Information", Jul. 31, 2018 (Jul. 31, 2018),

(56) References Cited

OTHER PUBLICATIONS

XP055839320, Retrieved from the Internet: URL:https://developer.ultrahaptics.com/knowledgebase/haptics-overview/ [retrieved on Sep. 8, 2021].
Office Action (Notice of Allowance and Fees Due (PTOL-85)) dated Dec. 14, 2021 for U.S. Appl. No. 17/170,841 (pp. 1-8).
Office Action (Non-Final Rejection) dated Dec. 20, 2021 for U.S. Appl. No. 17/195,795 (pp. 1-7).
EPO Application 18 725 358.8 Examination Report dated Sep. 22, 2021.
EPO 21186570.4 Extended Search Report dated Oct. 29, 2021.
Cappellari et al., "Identifying Electromyography Sensor Placement using Dense Neural Networks." In DATA, pp. 130-141. 2018. (Year: 2018).
ISR and WO for PCT/GB2023/050001 (dated May 24, 2023) (20 pages).
Montenegro et al., "Neural Network as an Alternative to the Jacobian for Iterative Solution to Inverse Kinematics," 2018 Latin American Robotic Symposium, 2018 Brazilian Symposium on Robotics (SBR) and 2018 Workshop on Robotics in Education (WRE) João Pessoa, Brazil, 2018, pp. 333-338 (Year: 2018).
Nuttall, A. (Feb. 1981). Some windows with very good sidelobe behavior. IEEE Transactions on Acoustics, Speech, and Signal Processing. 8 pages.
Office Action (Ex Parte Quayle Action) dated Jul. 20, 2023 for U.S. Appl. No. 16/843,281 (pp. 1-15).
Office Action (Ex Parte Quayle Action) dated Sep. 18, 2023 for U.S. Appl. No. 18/066,267 (pp. 1-6).
Office Action (Final Rejection) dated Jul. 25, 2023 for U.S. Appl. No. 17/454,823 (pp. 1-17).
Office Action (Final Rejection) dated Aug. 30, 2023 for U.S. Appl. No. 16/564,016 (pp. 1-15).
Office Action (Non-Final Rejection) dated Sep. 7, 2023 for U.S. Appl. No. 16/144,474 (pp. 1-16).
Office Action (Notice of Allowance and Fees Due (PTOL-85)) dated Jun. 16, 2023 for U.S. Appl. No. 17/354,636 (pp. 1-7).
Office Action (Notice of Allowance and Fees Due (PTOL-85)) dated Jul. 20, 2023 for U.S. Appl. No. 17/692,852 (pp. 1-8).
Office Action (Notice of Allowance and Fees Due (PTOL-85)) dated Aug. 2, 2023 for U.S. Appl. No. 16/843,281 (pp. 1-5).
Office Action (Notice of Allowance and Fees Due (PTOL-85)) dated Aug. 8, 2023 for U.S. Appl. No. 17/645,305 (pp. 1-8).
Office Action (Notice of Allowance and Fees Due (PTOL-85)) dated Sep. 11, 2023 for U.S. Appl. No. 18/065,603 (pp. 1-11).
Oyama et al., "Inverse kinematics learning for robotic arms with fewer degrees of freedom by modular neural network systems," 2005 IEEE/RSJ International Conference on Intelligent Robots and Systems, Edmonton, Alta., 2005, pp. 1791-1798, doi: 10.1109/IROS.2005.1545084. (Year: 2005).
Papoulis, A. (1977). Signal Analysis. The University of Michigan: McGraw-Hill, pp. 92-93.
Prabhu, K. M. (2013). Window Functions and Their Applications in Signal Processing . CRC Press., pp. 87-127.
Aksel Sveier et al., Pose Estimation with Dual Quaternions and Iterative Closest Point, 2018 Annual American Control Conference (ACC) (8 pages).
JP Office Action for JP 2020-534355 (dated Dec. 6, 2022) (8 pages).
Ken Wada, Ring Buffer Basics (2013) 6 pages.
Notice of Allowance dated Feb. 23, 2023 for U.S. Appl. No. 18/060,556 (pp. 1-10).
Office Action (Final Rejection) dated Mar. 21, 2023 for U.S. Appl. No. 16/995,819 (pp. 1-7).
Office Action (Non-Final Rejection) dated Mar. 1, 2023 for U.S. Appl. No. 16/564,016 (pp. 1-10).
Office Action (Non-Final Rejection) dated Mar. 22, 2023 for U.S. Appl. No. 17/354,636 (pp. 1-5).
Office Action (Non-Final Rejection) dated Apr. 19, 2023 for U.S. Appl. No. 18/066,267 (pp. 1-11).
Office Action (Non-Final Rejection) dated Apr. 27, 2023 for U.S. Appl. No. 16/229,091 (pp. 1-5).
Office Action (Non-Final Rejection) dated May 8, 2023 for U.S. Appl. No. 18/065,603 (pp. 1-17).
Office Action (Notice of Allowance and Fees Due (PTOL-85)) dated Mar. 8, 2023 for U.S. Appl. No. 17/721,315 (pp. 1-8).
Office Action (Notice of Allowance and Fees Due (PTOL-85)) dated Mar. 15, 2023 for U.S. Appl. No. 17/134,505 (pp. 1-5).
Office Action (Notice of Allowance and Fees Due (PTOL-85)) dated Mar. 24, 2023 for U.S. Appl. No. 17/080,840 (pp. 1-8).
Office Action (Notice of Allowance and Fees Due (PTOL-85)) dated Apr. 4, 2023 for U.S. Appl. No. 17/409,783 (pp. 1-5).
Office Action (Notice of Allowance and Fees Due (PTOL-85) dated Apr. 6, 2023 for U.S. Appl. No. 17/807,730 (pp. 1-7).
Office Action (Notice of Allowance and Fees Due (PTOL-85)) dated Apr. 28, 2023 for U.S. Appl. No. 17/195,795 (pp. 1-7).
Office Action (Notice of Allowance and Fees Due (PTOL-85)) dated May 12, 2023 for U.S. Appl. No. 16/229,091 (pp. 1-8).
Office Action (Notice of Allowance and Fees Due (PTOL-85)) dated May 24, 2023 for U.S. Appl. No. 16/229,091 (pp. 1-2).
Office Action dated Feb. 9, 2023 for U.S. Appl. No. 18/060,556 (pp. 1-5).
Office Action dated Mar. 3, 2023 for U.S. Appl. No. 18/060,525 (pp. 1-12).
Office Action dated Apr. 19, 2023 for U.S. Appl. No. 18/066,267 (pp. 1-11).
Partial ISR for PCT/GB2023/050001 (dated Mar. 31, 2023) 13 pages.
Rakkolainen et al., A Survey of Mid-Air Ultrasound Haptics and Its Applications (IEEE Transactions on Haptics), vol. 14, No. 1, 2021, 18 pages.
Office Action (Notice of Allowance and Fees Due (PTOL-85)) dated Jan. 18, 2022 for U.S. Appl. No. 16/899,720 (pp. 1-2).
Office Action (Non-Final Rejection) dated Jan. 24, 2022 for U.S. Appl. No. 16/228,767 (pp. 1-22).
Office Action (Non-Final Rejection) dated Jan. 21, 2022 for U.S. Appl. No. 17/068,834 (pp. 1-12).
Office Action (Notice of Allowance and Fees Due (PTOL-85)) dated Feb. 11, 2022 for U.S. Appl. No. 16/228,760 (pp. 1-8).
ISR and WO for PCT/GB2020/052829 (dated Feb. 10, 2021) (15 pages).
EPO Examination Report 17 748 4656.4 (dated Jan. 12, 2021) (16 pages).
Office Action (Notice of Allowance and Fees Due (PTOL-85)) dated Feb. 28, 2022 for U.S. Appl. No. 17/068,825 (pp. 1-7).
Mohamed Yacine Tsalamlal, Non-Intrusive Haptic Interfaces: State-of-the Art Survey, HAID 2013, LNCS 7989, pp. 1-9, 2013.
EPO Communication for Application 18 811 906.9 (dated Nov. 29, 2021) (15 pages).
ISR and WO for PCT/GB2021/052415 (dated Dec. 22, 2021) (16 pages).
Gareth Young et al.. Designing Mid-Air Haptic Gesture Controlled User Interfaces for Cars, PACM on Human-Computer Interactions, Jun. 2020 (24 pages).
Office Action (Non-Final Rejection) dated Mar. 4, 2022 for U.S. Appl. No. 16/404,660 (pp. 1-5).
Office Action (Notice of Allowance and Fees Due (PTOL-85)) dated Mar. 7, 2022 for U.S. Appl. No. 16/600,496 (pp. 1-5).
Communication Pursuant to Article 94(3) EPC for EP 19723179.8 (dated Feb. 15, 2022).
EPO ISR and WO for PCT/GB2022/050204 (dated Apr. 7, 2022) (15 pages).
IN 202047026493 Office Action dated Mar. 8, 2022.
ISR & WO For PCT/GB2021/052946.
Office Action (Final Rejection) dated Mar. 14, 2022 for U.S. Appl. No. 16/564,016 (pp. 1-12).
Office Action (Non-Final Rejection) dated Mar. 15, 2022 for U.S. Appl. No. 16/144,474 (pp. 1-13).
Office Action (Non-Final Rejection) dated Apr. 1, 2022 for U.S. Appl. No. 16/229,091 (pp. 1-10).
Office Action (Non-Final Rejection) dated May 2, 2022 for U.S. Appl. No. 17/068,831 (pp. 1-10).

\* cited by examiner

ULTRAHAPTICONS

PRIOR APPLICATIONS

This application claims the benefit of the following application, which is incorporated by references in its entirety: Ser. No. 63/079,708, filed Sep. 17, 2020.

FIELD OF THE DISCLOSURE

The present disclosure relates generally to improved techniques in establishing useful hand gestures within ultrasonic fields to activate features.

BACKGROUND

There are situations when receiving haptic feedback before touching the surface would be beneficial. These include when vision of the display is restricted, such as while driving, and when the user doesn't want to touch the device, such as when their hands are dirty. Providing feedback above the surface would also allow for an additional information channel alongside the visual.

A mid-air haptic feedback system creates tactile sensations in the air. One way to create mid-air haptic feedback is using ultrasound. A phased array of ultrasonic transducers is used to exert an acoustic radiation force on a target. This continuous distribution of sound energy, which will be referred to herein as an "acoustic field", is useful for a range of applications, including haptic feedback.

It is known to control an acoustic field by defining one or more control points in a space within which the acoustic field may exist. Each control point is assigned an amplitude value equating to a desired amplitude of the acoustic field at the control point. Transducers are then controlled to create an acoustic field exhibiting the desired amplitude at each of the control points.

Tactile sensations on human skin can be created by using a phased array of ultrasound transducers to exert an acoustic radiation force on a target in mid-air. Ultrasound waves are transmitted by the transducers, with the phase emitted by each transducer adjusted such that the waves arrive concurrently at the target point in order to maximize the acoustic radiation force exerted.

By defining one or more control points in space, the acoustic field can be controlled. Each point can be assigned a value equating to a desired amplitude at the control point. A physical set of transducers can then be controlled to create an acoustic field exhibiting the desired amplitude at the control points.

As a result, mid-air gesture interaction in the automotive domain has been explored to counteract some drawbacks associated with increasingly ubiquitous touchscreen interfaces (e.g. added complexity and increased eyes-off-the-road time) yet remains a relatively fledgling modality. Naturally, gestures have their own limitations, namely potential cultural semantic nuances, the learning associated with more intricate gestures, and a lack of a sense of agency. Focused ultrasound can be used to create haptic sensations without requiring physical contact which creates the opportunity to bind tangible sensations to mid-air gestures; thus, haptic sensations can provide confirmatory cues thereby increasing one's feeling of control over their gesture. The advent of this technology also provides an alternative to auditory feedback as the latter could plausibly displease vehicle occupants by interrupting conversations and audible media. Furthermore, mid-air haptic icons could allow more expressivity than previous haptic technologies as result of information encoded via novel spatial and temporal interplay. This could provide higher resolution in relaying feature semantics and therefore reduce the onus on having intuitive gestures, learning the meaning of haptic signals or visually attending to a touchscreen for information transfers. From a user experience standpoint, the refinement of mid-air haptics for an automotive gesture interface could also improve user engagement and aesthetic appeal as seen in applications in public digital signage.

Preliminary investigations have compared mid-air haptic gesture (MAHG) interfaces with industry trending touchscreen solutions, and have notionally combined existing gesture sets with stock haptic sensations. These studies demonstrated clear benefits associated with MAHG interfaces, such as reduced eyes-off-the-road times and increased task performance. However, beyond their scope, was using semiotic and psychophysical principles to ground original holistic interaction designs by mapping gestures and haptics with specific tasks as well as optimizing haptic intensity, transience, pattern, location on the hand etc. All of these factors are likely to play a key role in augmenting the opportunities that mid-air haptics present, therefore, the aim of this ongoing program of research is to build and evaluate an exemplar set of robust, function-associated haptic gestures—based on human-centered design—to support an in-vehicle infotainment system (IVIS).

Current automotive mid-air gesture interfaces provide only visual and audible feedback as confirmation of a successfully executed interaction with an IVIS. Visual feedback presents the complication of providing potential for additional driver distraction from the roadway which is the third most common cause of car crashes; this is one of the primary problems that gesture interfaces aim to solve. Audible feedback is a reasonable alternative to this problem; however, it can be intrusive to the driving experience by interrupting music, radio, conversations or even sleeping occupants.

Using an arbitrary mid-air haptic sensation that actuates onto the driver's hand after they have performed an appropriate gesture/hand-pose can let the driver know their input has been acknowledged by the system which improves the driver's sense of agency (control) in their interaction. However, they still cannot be absolutely certain that the system has correctly distinguished their performed gesture from others in a gesture set without this information relayed through visual or auditory feedback. The premise behind this invention is therefore to transfer this information through the haptic channel using function-associated and user-centered mid-air haptic icons or "Ultrahapticons". In this way, the driver can recognize the sensation for the intended infotainment feature and be confident they have made the right selection without removing their eyes from the road. Conversely if they recognize an Ultrahapticon that does not represent the feature they intended to select, they know there has been a false-positive in the system and they can perform their gesture again without affecting the system status. Additionally, Ultrahapticons hold potential for enabling an improved learning curve of the gesture set; this is a barrier to user acceptance of the interaction. Unfamiliarity with a novel interaction paradigm has also been linked to detrimental lane-keeping ability.

There have been a few research efforts to explore the augmentation of gestures with mid-air haptic feedback in the automotive sector as well as studies to investigate the human's ability to detect and recognize mid-air haptic sensations. Orestis Georgiou, Valerio Biscione, Adam Harwood, Daniel Griffiths, Marcello Giordano, Ben Long, and Tom Carter. 2017. Haptic In-vehicle gesture controls. 233-238. DOI: https://doi.org/10.1145/3131726.3132045 (Georgiou) demonstrated a mid-air haptic gesture (MAHG) interface in this 2017 conference paper. Their interface gave an example of how mid-air haptic sensations can be assigned to match the behavior of the gestural actions. This prototype demonstrated a proof-of-concept that mid-air haptic sensations can be mapped onto a driver's gesture in real-time, however, the sensations are intended to represent the gestures and not the features themselves.

David R. Large, Kyle Harrington, Gary Burnett, and Orestis Georgiou. 2019. Feel the noise: Mid-air ultrasound haptics as a novel human-vehicle interaction paradigm. Appl. Ergon. (2019). DOI: https://doi.org/10.1016/j.apergo.2019.102909 (Large) conducted a study where mid-air haptic buttons are seemingly suspended above the gear shifter in a driving simulator. The driver can "tap" these buttons with their palm to select and then move their palm sideways to adjust. During the adjustment interaction the driver feels haptic clicks on the palm to represent increments. This study aimed at evaluating the human factors issues when gestures are augmented with haptics in terms of driver safety and user experience, they found there were genuine advantages over in-vehicle touchscreen and non-haptic gesture input methods. This study provides evidence for the utility of mid-air haptics from an automotive human factors stand-point however the interface was function agnostic and the tasks were purely arbitrary.

Gözel Shaken, John H. Williamson, and Stephen Brewster. 2018. May the force be with you: Ultrasound haptic feedback for mid-air gesture interaction in cars. Proc.—10th Int. ACM Conf. Automot. User Interfaces Interact. Veh. Appl. AutomotiveUI 2018 July (2018), 1-10. DOI: https://doi.org/10.1145/3239060.3239081 (Shaken) ran an experiment to establish the effects of combining 3 forms of feedback including peripheral visual, auditory and mid-air haptics. The sensations they used followed similar logic to the Georgiou et al prototype in that they mimicked the behavior and nature of the gesture and not the feature itself i.e. a gesture performed with a clockwise circular motion to increase volume was paired with a haptic that displayed a clockwise circular motion. In this study the participants were not always able to feel the sensations or distinguish between them which caused them to ignore the mid-air haptics entirely in some cases.

Davide Rocchesso, Francesco Saverio Cannizzaro, Giovanni Capizzi, and Francesco Landolina. 2019. Accessing and selecting menu items by in-air touch. (2019), 1-9. DOI: https://doi.org/10.1145/335195.3352053 (Rocchesso) demonstrate a methodology for using arbitrary shapes as icons for different items in a multi-level menu. They show that certain shapes are easily confused with one another and should not be included coincidentally in a menu design. The icons used in this paper were arbitrary with no direct application for a specific use as this was not the intention of the research.

SUMMARY

Ultrahapticons are a set of tangible and recognizable mid-air haptic icons that have been derived from research study participants' metaphorical associations with car infotainment features by detecting movement of a human hand to operate an automotive function. In line with semiotic theory (the study of signs), data from the study was analyzed to identify key characteristics that when realized in mid-air haptic form, would enable a user to "feel" the feature they are interacting with. Their use is not limited to an automotive context, they can be instrumented to any application that exhibits the same feature functionality i.e. home entertainment system, laptop UI's, digital communication, Extended Reality (XR) etc.

BRIEF DESCRIPTION OF THE DRAWINGS

The accompanying figures, where like reference numerals refer to identical or functionally similar elements throughout the separate views, together with the detailed description below, are incorporated in and form part of the specification, serve to further illustrate embodiments of concepts that include the claimed invention and explain various principles and advantages of those embodiments.

Figure 1:
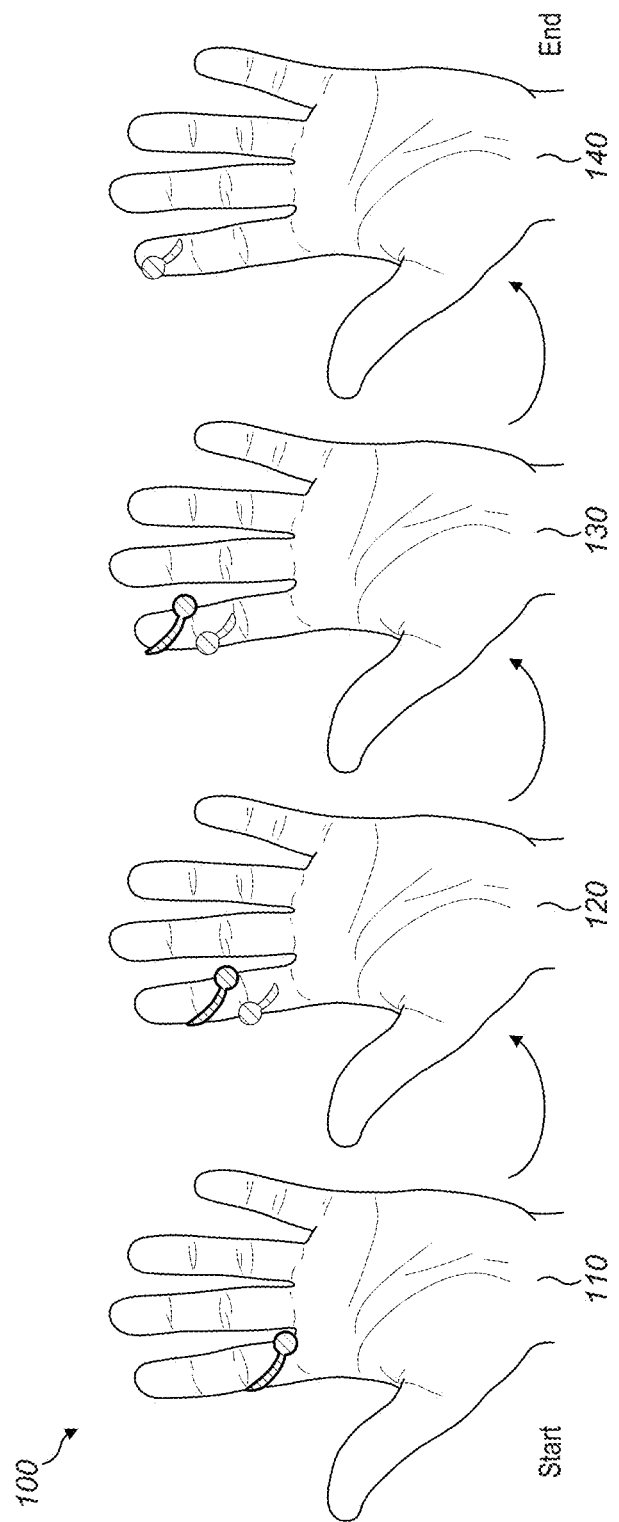
FIGS. 1-3 show Ultrahapticons for telephone calls.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent.

DETAILED DESCRIPTION

I. Variable Haptic Sensitivity within the Hand

Various parts of the hand are susceptible to haptic effects in different ways. For example:
1. Threshold Value. The fingertip has a lower threshold value than the palm. Since the maximum output of our device is also limited, that means that there will be more values of intensity that can be discriminated from within the fingertips.
2. Frequency. The frequency range relevant to touch (0-500 Hz) is common through the body. But frequency resonance is achieved at different value of frequency through the hand. This means that greater displacement, and therefore greater perceived strength, can be achieved by designing Ultrahapticons with the right frequency for the right body part.
3. Mechanoreceptor Density. The density of each mechanoreceptor through the hand is not constant. Discrimination between waveform will be greater at the fingertips.
4. Pattern Propagation. Surface wave propagates through the skin and can affect positively or negatively our perception of mid-air haptics (e.g., speed optimization). This is specifically true for the palm, which is a large continuous skin part, but it is less true on a finger where skin parts are interrupted by the joints crease. It doesn't apply between fingers since this involves different skin parts. In addition, 2-point discrimination threshold (the ability to perceive two points as distinct and not one) is higher on the palm than on the fingertips. This means that multiple patterns, such as parallel lines or concentric circles, cannot be simultaneously render on the palm without being confused as one large fuzzy buzz. However, multiple patterns can be rendered on bones of a same finger.

II. Suite of Ultrahapticons

Figure 12:
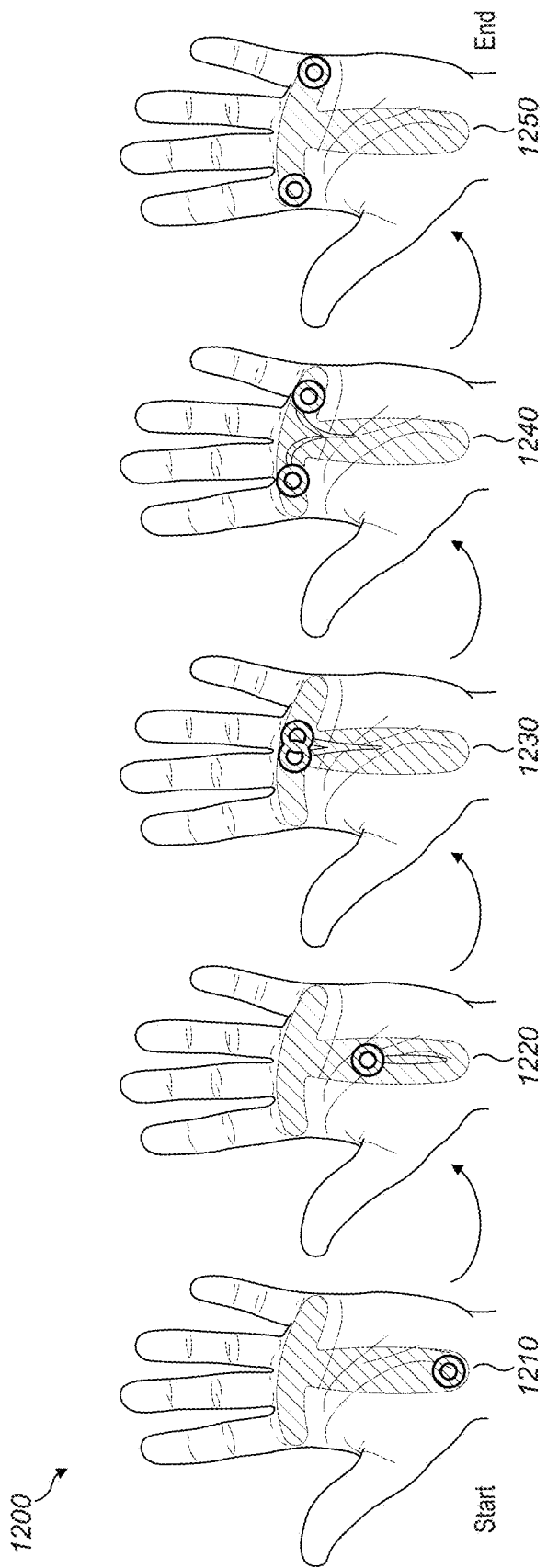
FIGS. 12-14 show Ultrahapticons for navigation.
Figure 13:
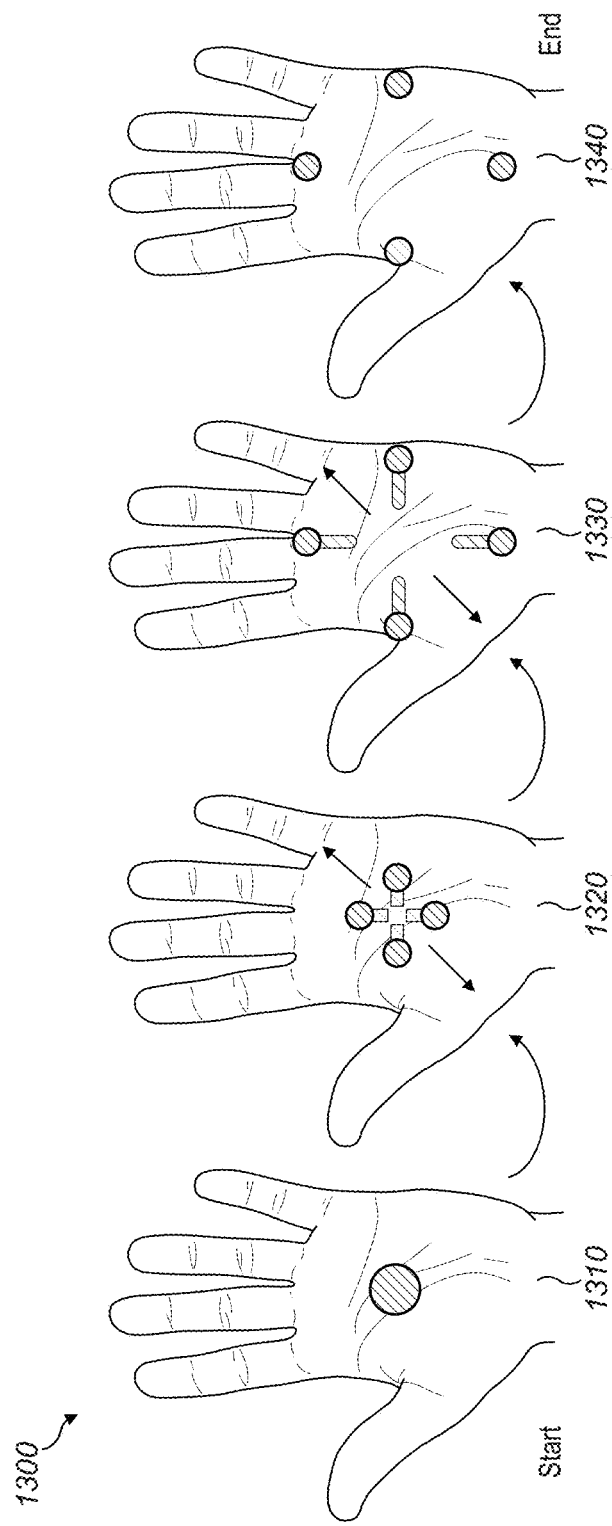

FIGS. 1-16 show 17 sensations that were generated for 7 infotainment features in a participatory design process (without limitation, the features shown in FIG. 13 can also be performed in reverse). The categories of features for which Ultrahapticons have been designed include: (a) telephone calls; (b) audio; (c) cabin temperature; (d) seat temperature; (e) fan speed; (f) navigation; and (g) home screen (i.e., a user interface landing page). Although specific time and space parameters are described herein, other parameters may similarly be operative to produce similar effects.

In addition, Ultrahapticons may be classified by where on the hand the effect is felt.

A. Ultrahapticons for Telephone Calls

FIG. 1 shows a sequence 100 for a metaphor: "Coiled Wire". This Ultrahapticon intends to match with the metaphor of coiling the wire of a traditional telephone around the finger. The user receives a single focal point (dark dot) 110 that travels along a path (dark lines) rendered at around a 35-degree angle from right to left in three sequential locations 120, 130, 410 going up the index finger towards the tip.

This is a "single finger only" Ultrahapticon.

Figure 2:
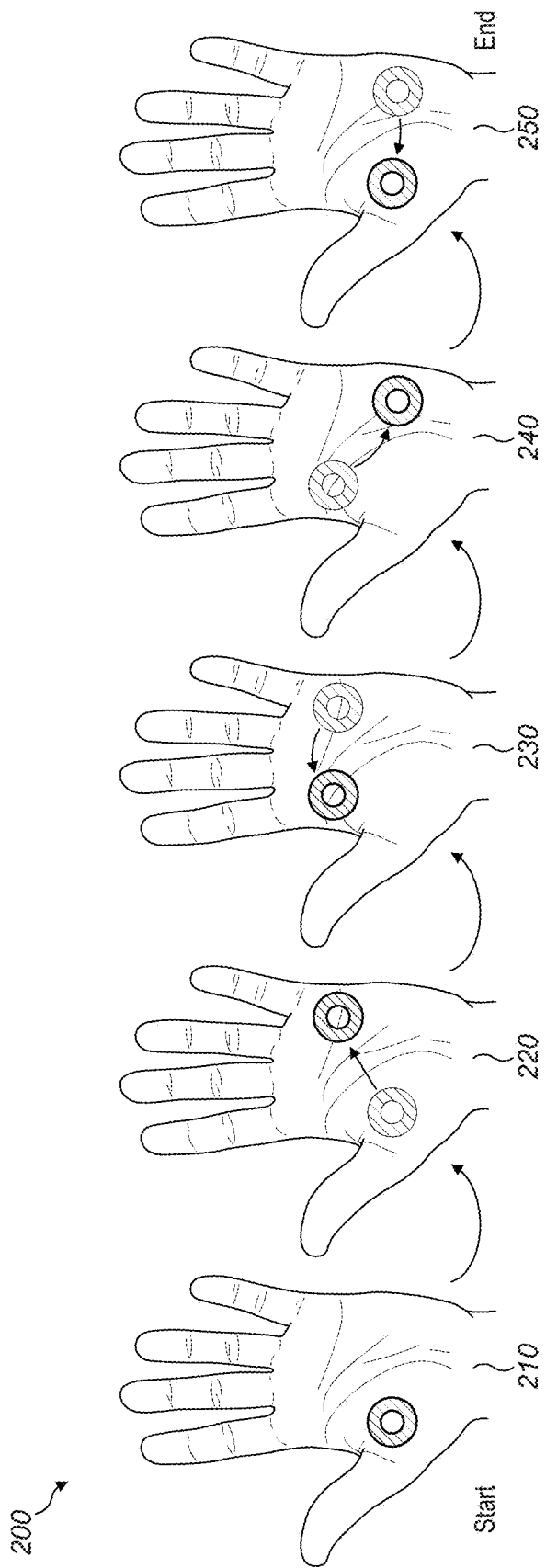

FIG. 2 shows a sequence 200 for a metaphor: "Bouncing Handset". This Ultrahapticon is intended to emulate the handset of an old telephone, bouncing in its cradle as it rings, the focal rings are supposed to represent the speaker and microphone sections of the handset. The user receives a focal ring 210 "bouncing" between 4 locations 220, 230, 240, 250 to the temporal rhythm of a retro telephone ring. The full sensation consists of a 1 second loop of 6 taps over the 4 locations (with 2 taps at the final location–base of thumb). After the first 3 taps there is a small pause before the next 3 follow.

This is a "palm only" Ultrahapticon.

Figure 3:
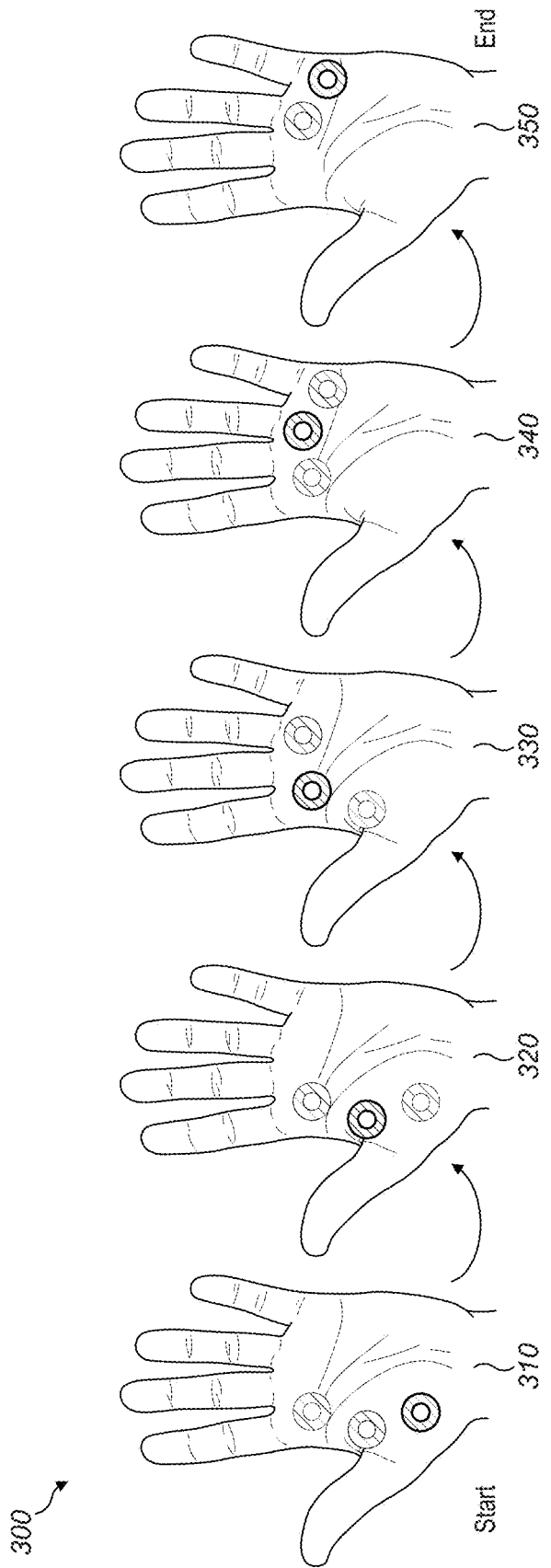

FIG. 3 shows a sequence 300 for a metaphor: "Rotary Dial". This Ultrahapticon aims to emulate the holes of a rotary dial on an old-fashioned telephone. When accepting an incoming phone call, the user shall receive 5 sequential, equally spaced haptic circles 310, 320, 330, 340, 350 that are rendered from the bottom left of the palm in a semi-circular path to the base of the little finger knuckle; each haptic circle is sequentially stronger intensity than the last. If the user were rejecting an incoming phone call, they would receive the above sensation however this time it would be flipped 180 so that the sensation starts at the base of the little finger, follows the medial edge of the palm and ends at the base of the thumb. The sequence of intensity is also reversed so that each haptic circle is 0.1 less than the previous intensity, i.e., 1-0.6.

This is a "palm only" Ultrahapticon.

B. Ultrahapticons for Audio

Figure 4:
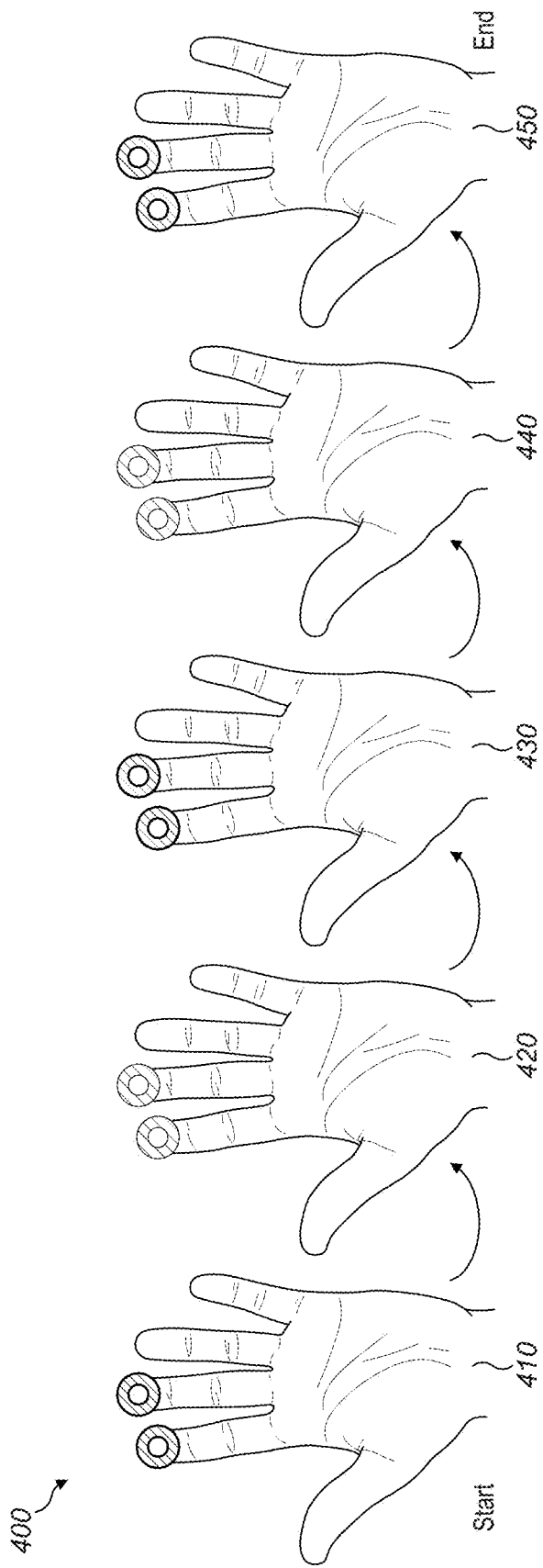
FIGS. 4-5 show Ultrahapticons for audio.

FIG. 4 shows a sequence 400 for a metaphor: "Bass Speaker". For this Ultrahapticon, the driver receives a continuous pulsing sensation 410, 420, 430, 440, 450 at the ends of the fingertips that intends to resemble the users' metaphor of bass emanating from a speaker.

This is a "two finger only" Ultrahapticon.

Figure 5:
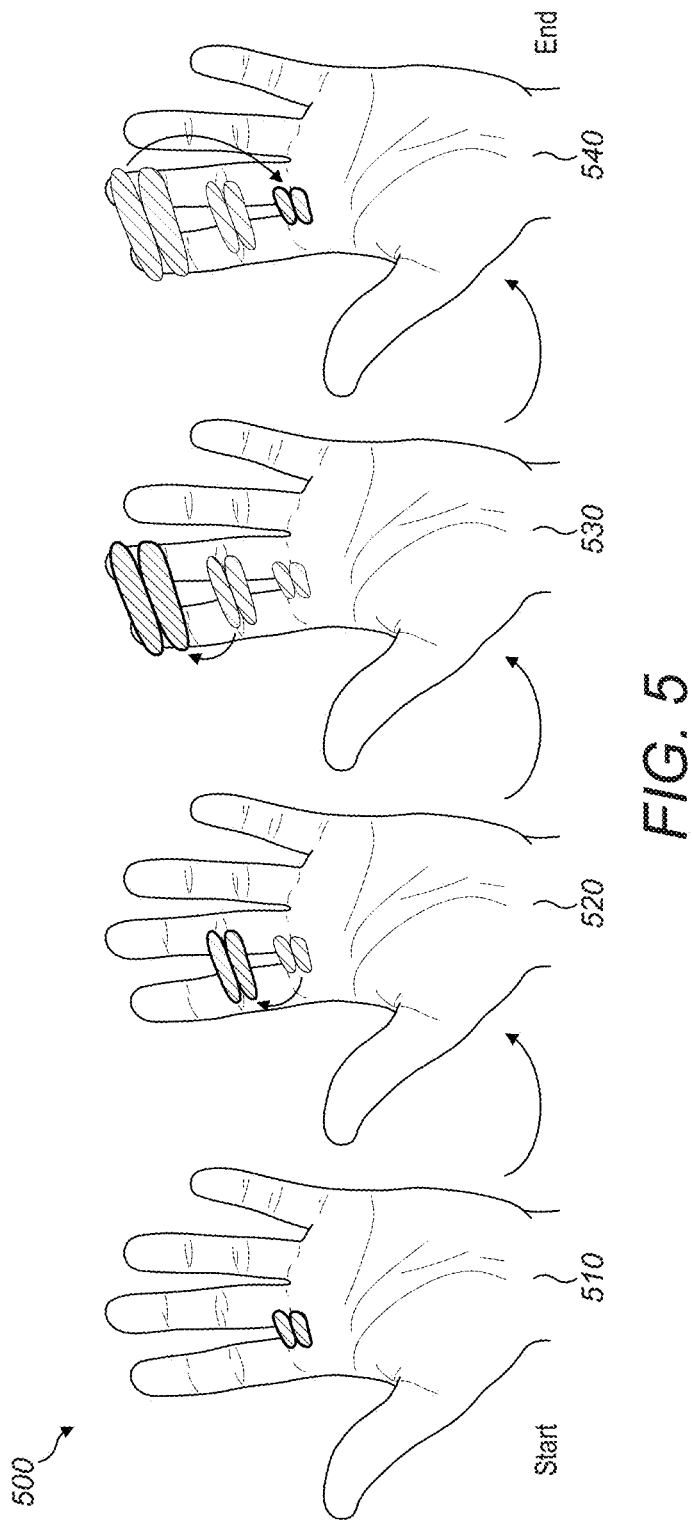

FIG. 5 shows a sequence 500 for a metaphor: "Sound Waves". The intention with this Ultrahapticon is to signify the users' metaphor of sound waves. The user receives a small two bar sensation that starts in between the middle and index finger knuckle 510 that increases in size as it travels up the fingers 520, 530. The small two bar sensation then resumes in between the middle and index finger knuckle 540.

This is a "two finger only" Ultrahapticon.

C. Ultrahapticons for Cabin Temperature

Figure 6:
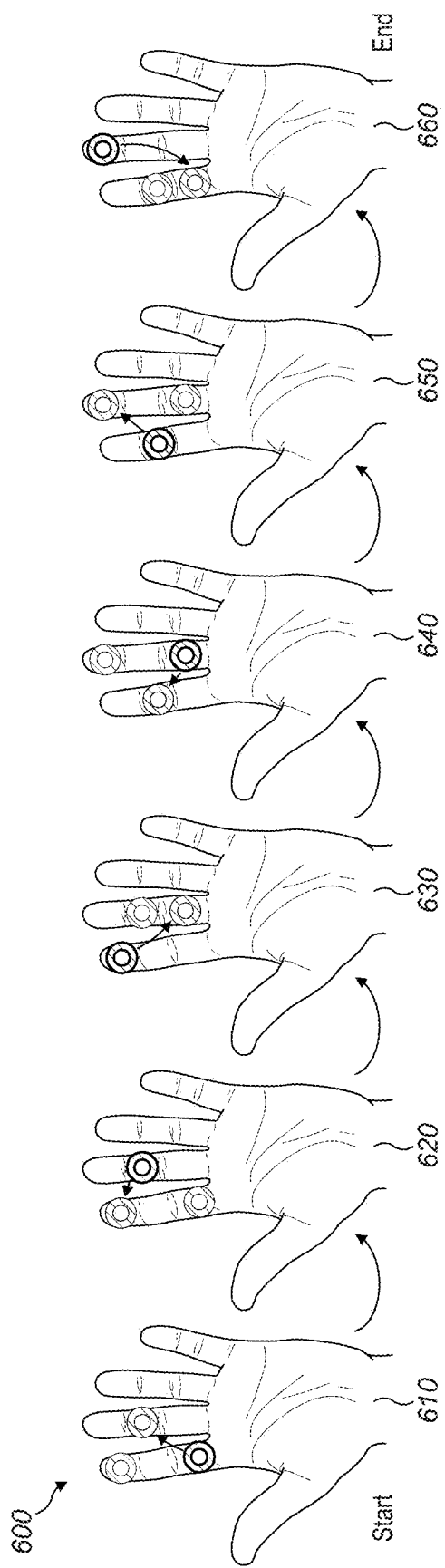
FIGS. 6-8 show Ultrahapticons for cabin temperature.

FIG. 6 shows a sequence 600 for a metaphor: "Flames". The user receives a continuous sensation of focal points that intend to represent the metaphor of flames licking the index and middle fingers 610, 620, 630, 640, 650, 660 to signify the hot aspect of temperature. The focal points will jump randomly from one location on one finger to another on the other finger with equal intervals. The locations will be dictated by the 3 joints on the fingers.

This is a "two finger only" Ultrahapticon.

Figure 7:
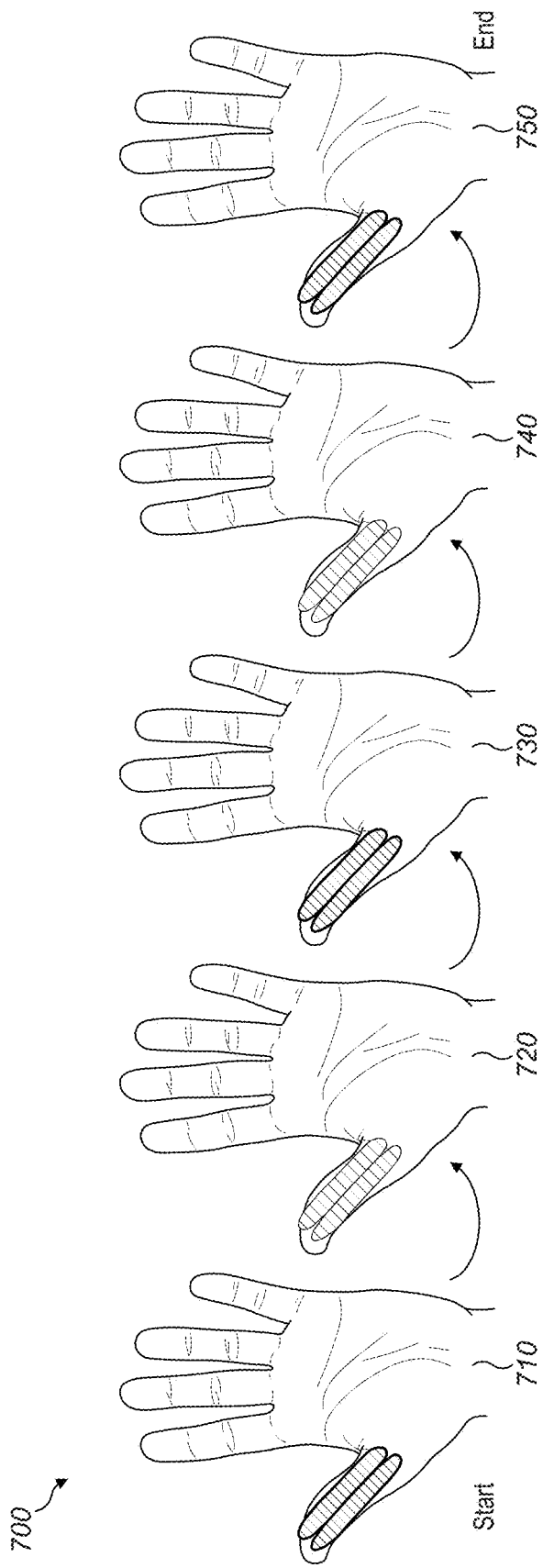

FIG. 7 shows a sequence 700 for a metaphor: "Ice". The user shall receive a solid double bar on the thumb actuating at 4 pulses per second (BPS) 710, 720, 730, 740, 750. This Ultrahapticon represents the metaphor of ice in order to signify the cool aspect of temperature and can be used in conjunction with Flames to create a representation of a temperature scale.

This is a "thumb only" Ultrahapticon.

Figure 8:
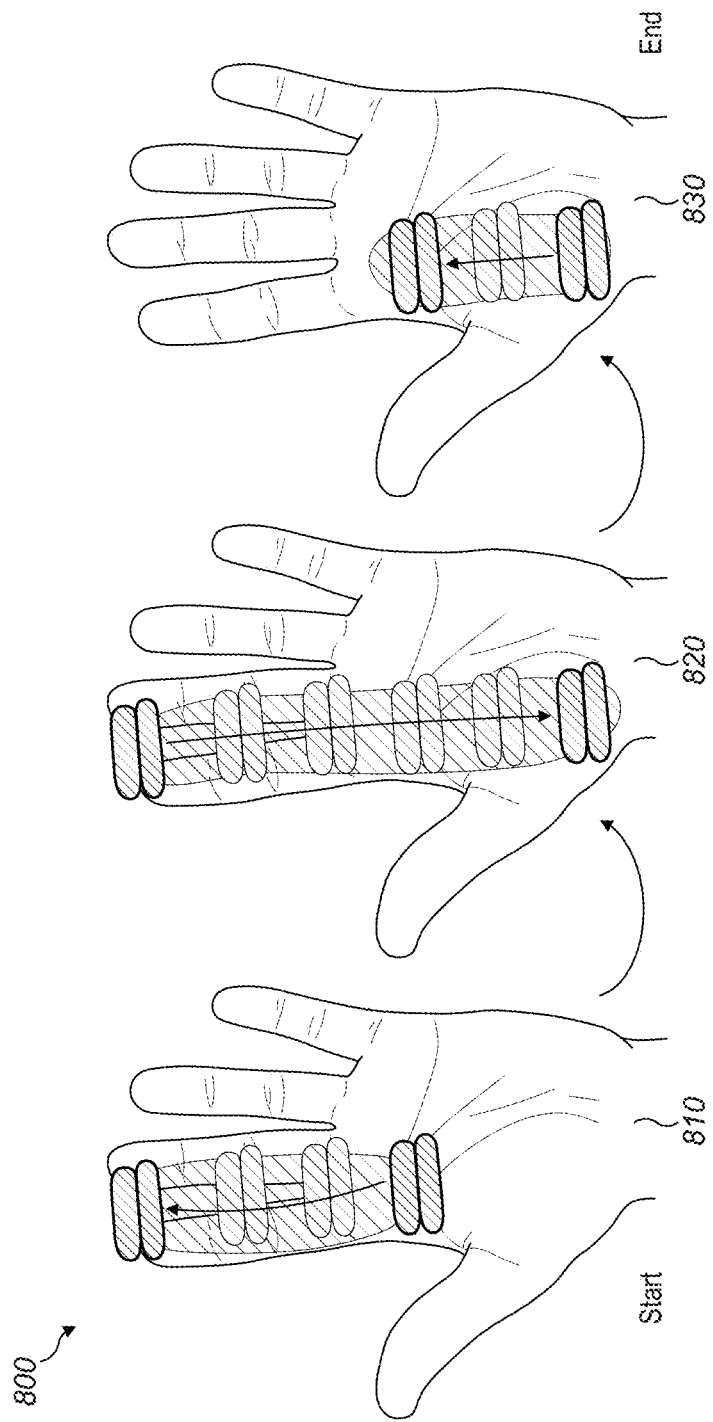

FIG. 8 shows a sequence 800 for a metaphor "Thermometer". This Ultrahapticon aims to convey the rising and falling mercury in the metaphor of a thermometer and subsequently represent temperature. The user feels a "double bar" haptic sensation, initially, halfway up the palm; this "double bar" then accelerates up the index and middle fingers and decelerates as it reaches the fingertips where it pauses momentarily 810. Once at the fingertips, the double bar then accelerates all the way down the hand and then decelerates as it reaches the bottom of the palm where it pauses momentarily again 820. After this, the double bar slides back to the original position. Within this haptic animation there will be notches at, for example, 6 equidistant locations in the travel envelope. Thus, the user will feel a drop in intensity between these locations to accentuate the metaphor of a thermometer's increments. After the initial animation, to indicate increasing temperature, the double bar starts focused on the middle of the hand then it will travel to the index and middle fingertips over 2 seconds. Conversely, to indicate a decrease in temperature, the double bar will travel down from the middle of the hand to the bottom of the palm over 2 seconds.

This is a "palm and two finger" Ultrahapticon.

D. Ultrahapticons for Seat Temperature

Figure 9:
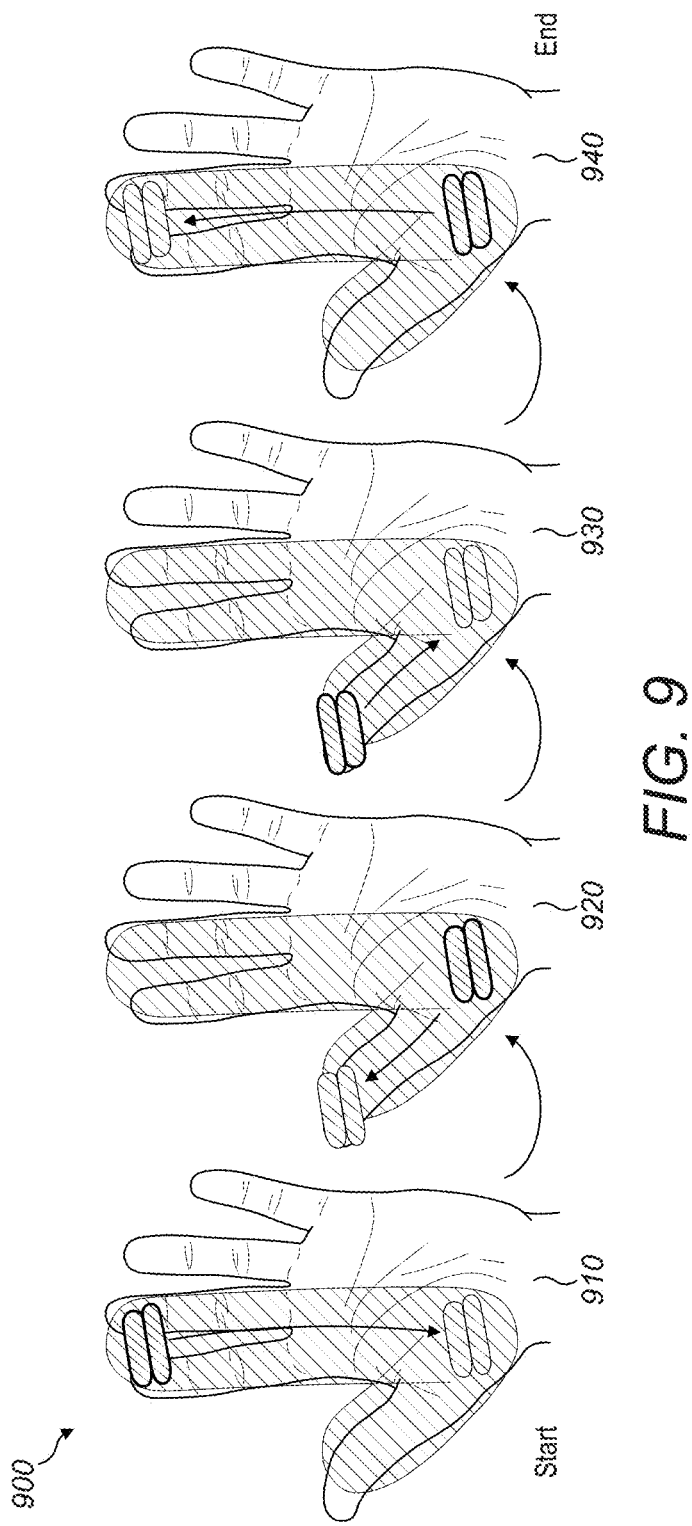
FIGS. 9-10 show Ultrahapticons for seat temperature.

FIG. 9 shows a sequence 900 for a metaphor: "Seat Profile". This Ultrahapticon aims to convey the profile of a seat that is prevalent metaphor for the seat heater and cooler. The user will feel a "double bar" haptic sensation, initially, at the tips of the index and middle fingers. This "double bar" then accelerates down the index and middle fingers and decelerates as it reaches the base of the thumb/bottom of palm where it where it pauses momentarily 910. Once at the base of the thumb, the double bar then accelerates up towards the thumb where it decelerates at the tip and pauses momentarily again 920. After this, it accelerates down to the base of the thumb, pauses momentarily 930 and then accelerates back up the index and middle fingers and culminates with another subtle deceleration 940.

This is a "thumb, palm and two finger" Ultrahapticon.

Figure 10:
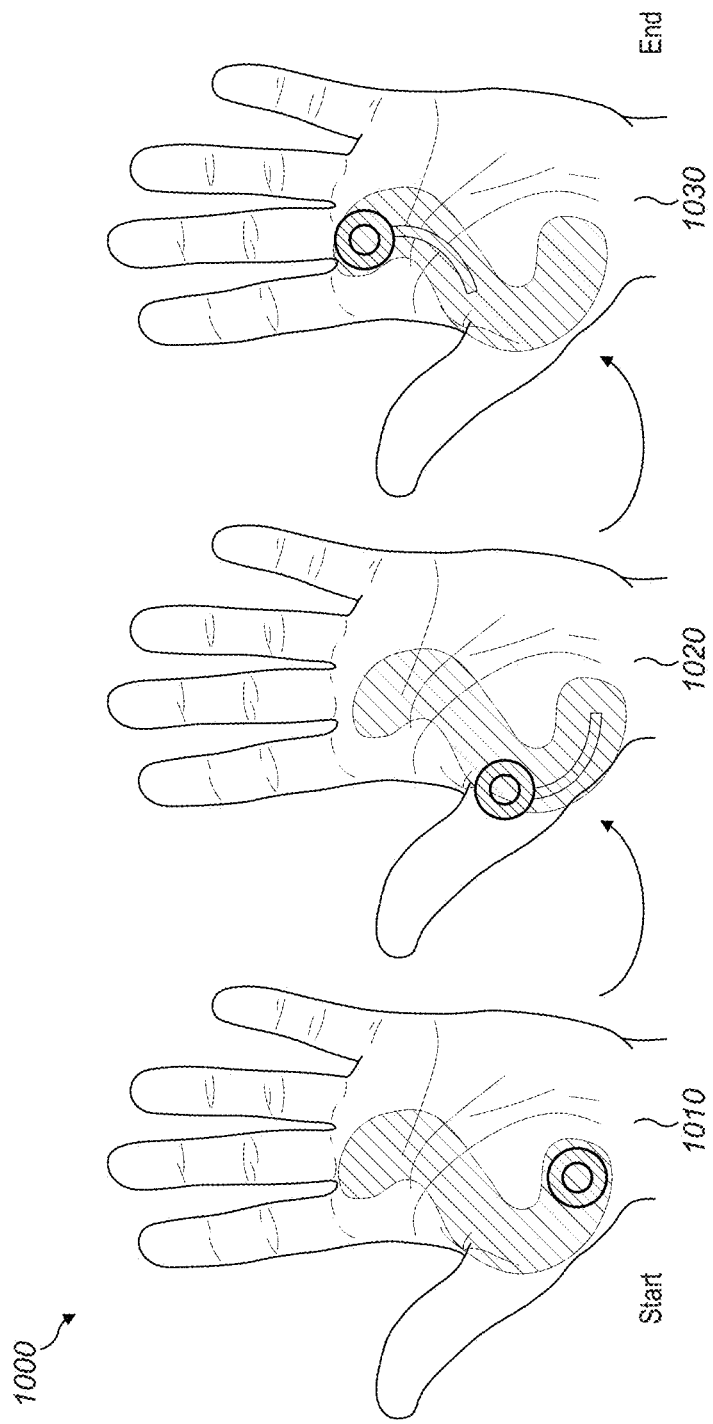

FIG. 10 shows a sequence 1000 for a metaphor: "Heating Elements". This Ultrahapticon aims to convey snaking heating elements embedded in a car seat which are associated with the seat temperature feature. The user feels a focal ring at the base of the thumb 1010; this sensation then travels in an S-shape path up the palm 1020 to finish at the base of the middle finger knuckle 1030.

This is a "palm only" Ultrahapticon.

E. Ultrahapticons for Fan Speed

Figure 11:
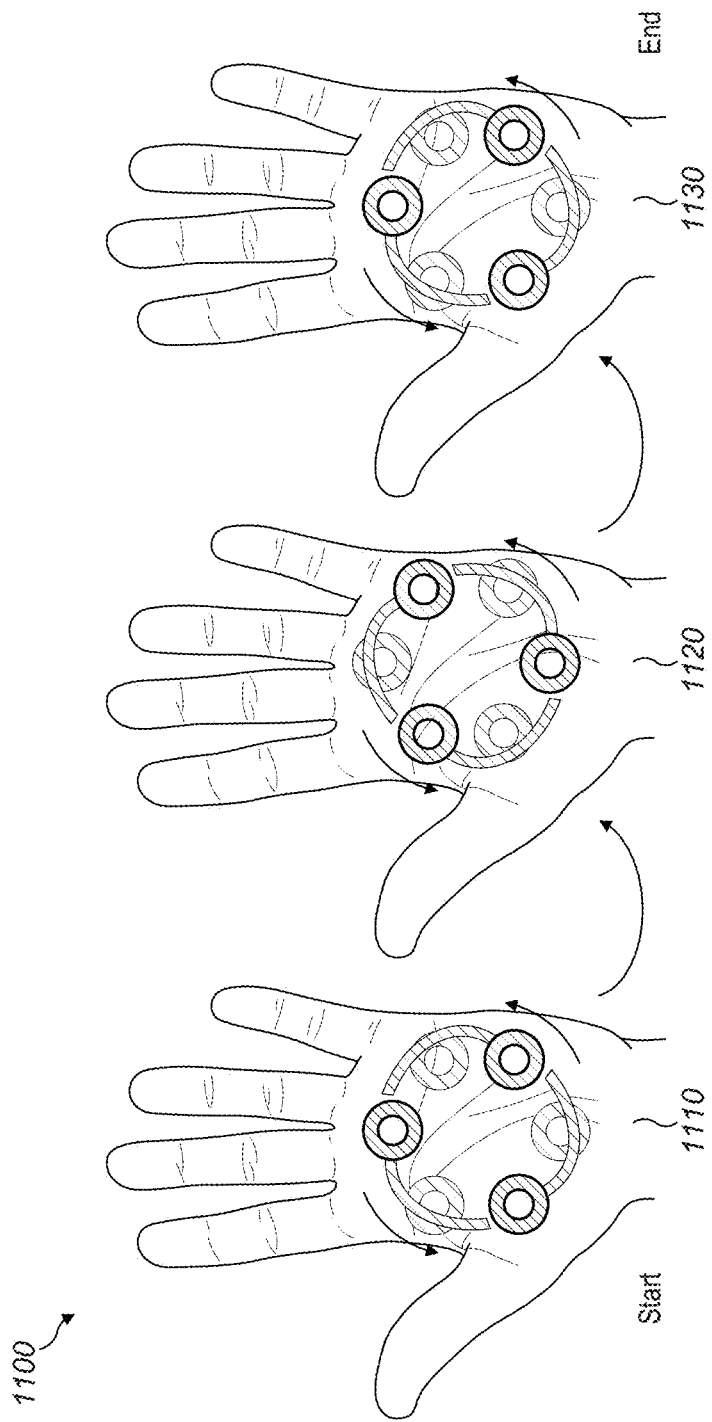
FIG. 11 shows Ultrahapticons for fan speed.

FIG. 11 shows a sequence 1100 for a metaphor: "Propeller Fan". The user receives a continuous anti-clockwise rotation of 3 haptic focal points 1110, 1120, 1130 to represent the users' metaphor of a propeller fan turning.

This is a "palm only" Ultrahapticon.

F. Ultrahapticons for Navigation

FIG. 12 shows a sequence 1200 for a metaphor: "T Junction". This Ultrahapticon represents a T-junction on a road which was commonly elicited as participants' mental model for navigation. The user receives a dynamic sensation that starts with a single focal point at the middle-bottom of the palm 1210 then travels up the palm 1220. Once the haptic focal point reaches the center of the knuckles 1230, it splits into two separate focal points 1240, 1250; one travels left across the knuckles and the other follows right along the knuckles.

This is a "palm only" Ultrahapticon.

FIG. 13 shows a sequence 1300 for a metaphor: "Compass Out". This Ultrahapticon aims to coincidentally represent three separate metaphors: "the compass", "crossroads" and "'X' marks the spot". A single focal point starts in the center of the palm 1310, from which splits off four focal points of equal size 1320. These four focal points move in synchrony 1330 towards equidistant locations at the distal, proximal, lateral, and medial extremes of the palm 1340. An alternative to the "Compass Out" is the "Compass In" which works in the dynamic inverse of the of the above sensation.

This is a "palm only" Ultrahapticon.

Figure 14:
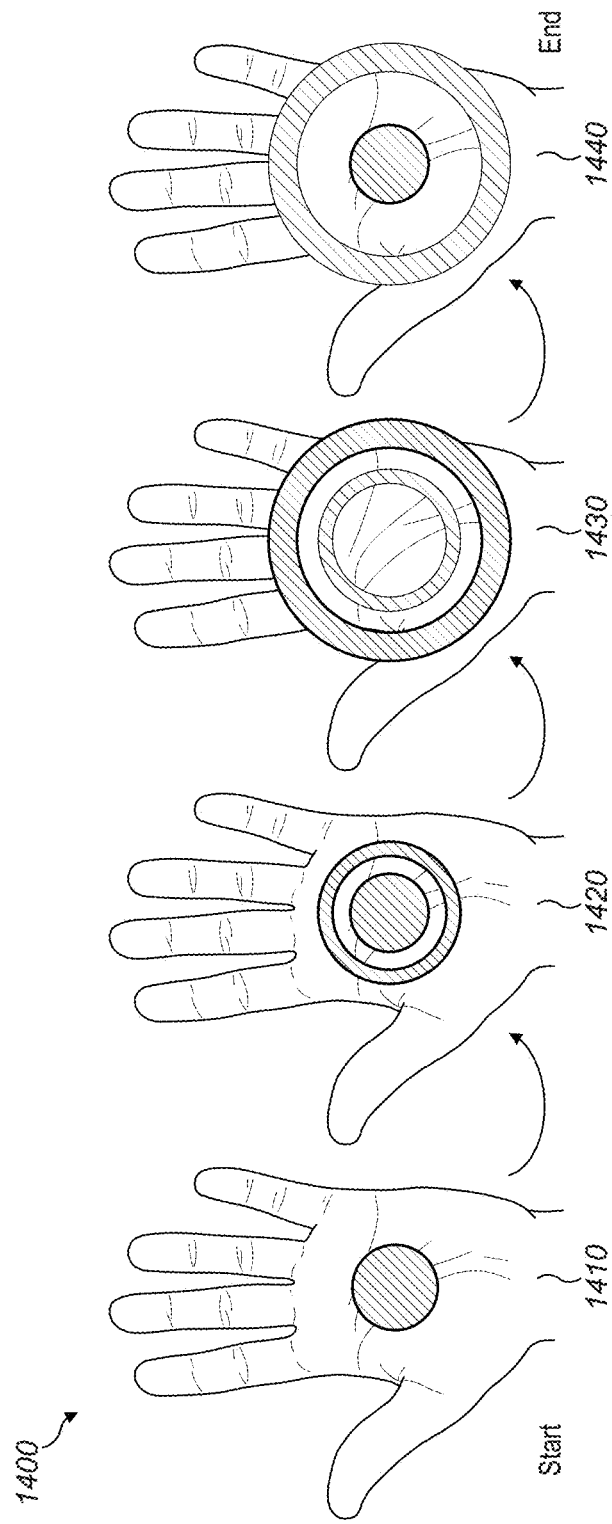

FIG. 14 shows a sequence 1400 for a metaphor: "Waypoint Blip". This Ultrahapticon represents the metaphor of waypoint visual on a GPS interface to signify navigation. A pulse in the center of the palm 1410 spreads outwards 1420, 1430 and fades 1440.

This is a "palm only" Ultrahapticon.

G. Ultrahapticons for Home Screen

Figure 15:
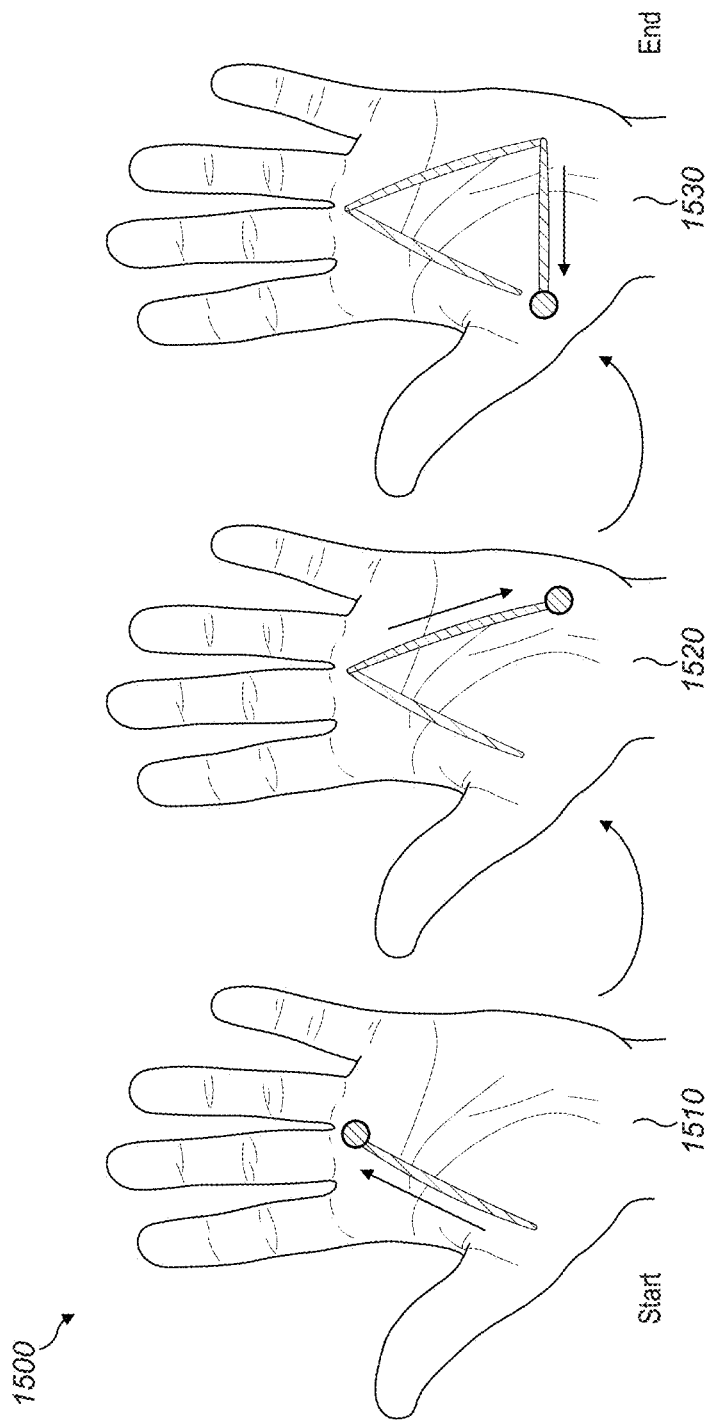
FIGS. 15-16 show Ultrahapticons for a home screen.

FIG. 15 shows a sequence 1500 for a metaphor: "House Roof". A focal point renders an equilateral triangle to represent the roof of a house which was a construct extracted by participants to represent the "Home" function. The focal point starts at the base of the thumb 1510 and completes three separate strokes as sides of the triangle. At each point of the triangle there is a momentary pause before the rendering continues 1520, 1530 as this is known to improve recognition.

This is a "palm only" Ultrahapticon.

Figure 16:
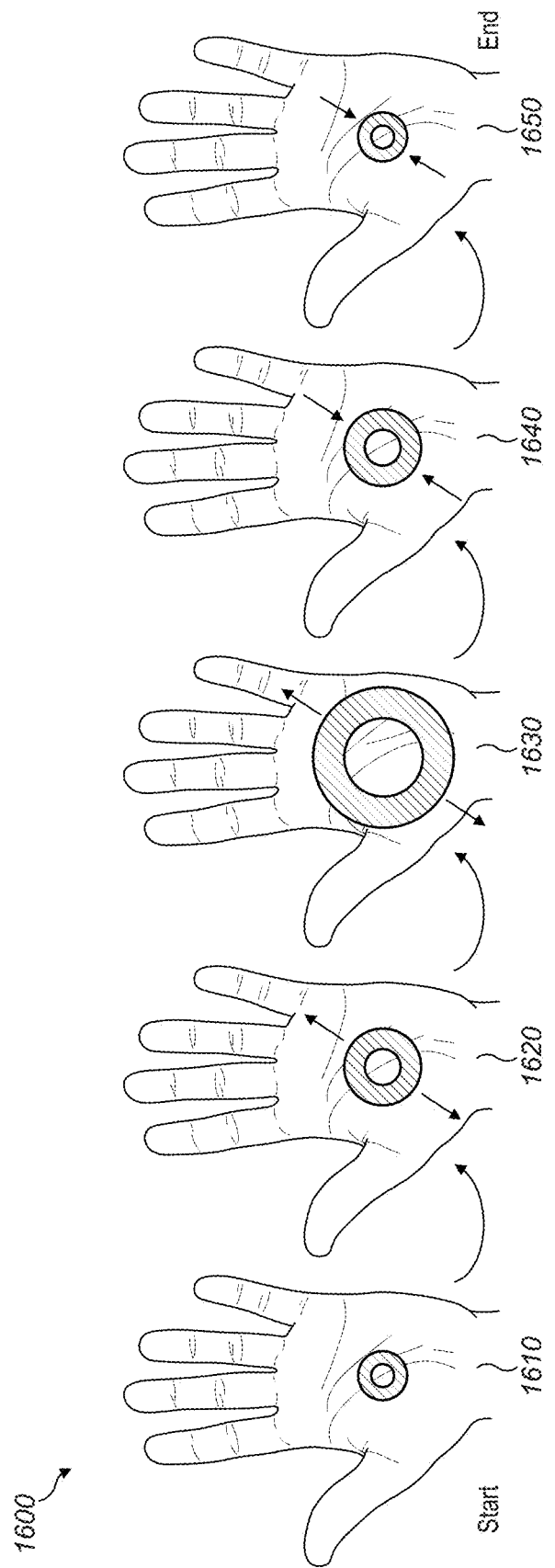

FIG. 16 shows a sequence 1600 for a metaphor: "Sofa Cushion". A mid-air haptic ring starts in the center of the palm 1610, it expands in thickness and diameter 1620, 1630 at which point it shrinks back to its original dimensions 1640, 1650. This Ultrahapticon replicates the compression of a cushion as one sits on a sofa; this is a semi-abstract metaphor that study participants had for the home screen function.

This is a "palm only" Ultrahapticon.

III. Study of Ultrahapticons Creation

A. Feature and Participant Selection

It was evident in the related work that the non-driving related task (NDRT) and User Interface (UI) design is principle in the success of MAHGs. Results from Large indicated that MAHGs appear superior to a touchscreen interface and mid-air gestures (without haptics), with regard to visual demand and task performance, for tasks that involve incrementally adjusting a setting. However, the results indicate that the touchscreen is more appropriate for the selection of a non-goal orientated 4×4 button grid when compared with MAHGs in a car following paradigm simulation. Arguably, the button selection condition might yield different results if the UI reflected the smaller button proportions inherent in some contemporary production vehicles. Hence, an expert user experience appraisal was conducted in a Tesla Model X to identify ecologically valid features and interactions in the touchscreen interface that could benefit from actuation using MAHGs. These consisted of discrete selection and continuous adjustment interactions for fan speed, cabin and seat temperature, navigation and audio volume; discrete shortcut interactions for telephone calls and the landing page (home) as well as response to telephone call notifications.

A participatory design study was subsequently conducted with a sample of seventeen participants (Male n11, Female n6, Age Range 19-65 yrs, mean 30 yrs) comprising members of the Nottingham Electric Vehicle Owners Club, staff and students at the University of Nottingham and non-technical employees at Ultraleap Ltd. Understanding cultural difference was considered important therefore multiple nationalities were recruited for the sample (UK [n7], Mexico [n3], Malaysia [n3], Hungary [n1], Spain [n2] and India [n1]).

B. Participatory Design Study Procedure

The procedure encompasses an amalgamation of learnings from related literature. Six of the participants were involved in individual face-to-face sessions where they experienced the mid-air haptic technology (the exposed group); eleven were organized remotely as a result of Covid-19 lockdown measures (the non-exposed group), the technology was therefore comprehensively demonstrated to them via remote video call.

C. Cognitive Mapping

Following a practice word-association task, participants verbalized the mental models they associated with each infotainment feature. Specifically, participants were asked "For the words [infotainment feature] what would you associate [tactually i.e. physical sensations; visually, as mental images or objects and auditorily i.e. sounds.]?". Participants were encouraged to consider the words themselves and not the features within context based on findings that structuring the questioning in this way led to less bias yet still yielded concrete metaphors.

D. Mental Model Visualization.

The next stage involved asking the participants to sketch the visual, auditory and tactual elements they had previously mentioned. In consideration of differing sketching abilities, the participants were encouraged to follow a "think-aloud" protocol as they sketched; this would enable the investigator to review video footage to understand the participants' thought processes if the sketch wasn't sufficiently communicative. The investigator demonstrated with an arbitrary example of a radio metaphor illustrated as a retro "boombox" radio, and then directed the participants to render a conceptual sketch for each feature. The "exposed" group were then demonstrated examples of sensations via the Ultraleap STRATOS explore array and the non-exposed group had the technology and types of sensations thoroughly described to them with aid from a graphical visualizer. The participants were then informed of twelve tunable, mid-air haptic parameters that could be manipulated to create different sensations. Using this information the participants highlighted elements of each sketch they thought most embodied the metaphor (i.e. the antenna on the radio example); they were then encouraged by the investigator to elicit how they would use the parameters, along with a nominal open palm gesture, to encapsulate these characteristics as their personal mid-air haptic icons, or "Ultrahapticons".

E. Ultrahapticon Refinement

The next step guided the participants to extend their designs to include how specific dimensions of the sensation would adapt to reflect a user-manipulated change in the feature setting (real-time interactional feedback). This time the participants were asked to consider that the feature will be adjusted using a more realistic "index finger and thumb pinch" hand pose and that they should elicit what axis this hand pose should move along to influence the function. This gesture was selected based on current design guidelines for automotive gesture interfaces generated by the array manufacturer-Ultraleap.

F. Semiotic Decomposition

The Ultrahapticon study elicited 119 total sketched designs which were analyzed for their semiotic components to determine the most intuitive designs for each feature (referent). First the participants' mental model sketches were classified into distinct prevailing styles (proposals). Although not specifically instructed to, many of the participants proposed multiple styles for a single referent. To account for this, the proposals were analyzed for "Max Consensus" (MC: percent of participants eliciting the most popular proposal) and "Consensus-Distinct Ratio" (CDR: the spread of participants displaying the most popular proposal—the closer the value is to 1, the smaller the spread and the more agreement there is among participants). Singular incidences of proposals were eliminated resulting in a shortlist of 23 Ultrahapticon styles for the 7 features.

The next level of analysis involved breaking down the styles into exemplar level semiotic components; their feature "constructs" and "intents". Constructs are physical characteristics of a feature that, collectively, comprise the holistic mental model (e.g. the rails of a rocking chair); an intent is a symbolic construct that is used by the designer to express meaning or behavior (e.g. blurred lines indicating movement of the rocking chair).

Figure 17:
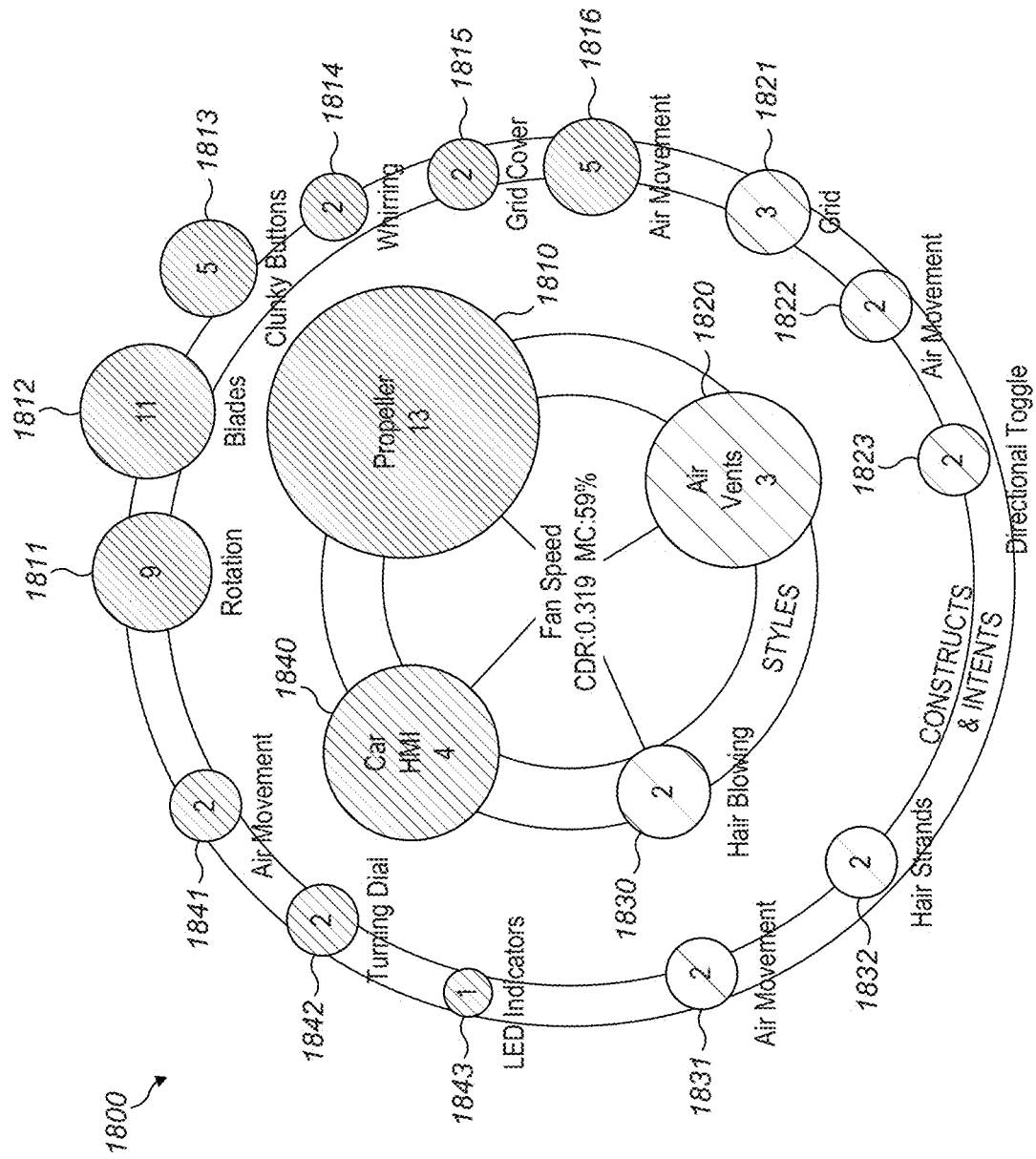
FIG. 17 shows semiotic components drawn from fan speed sketches.

FIG. 17 shows one example as the process map 1800 for the fan speed feature with a CDR of 0.319 and MC of 59%. "Styles" included propeller 1810, air vents 1820, hair blowing 1830 and car HMI 1840. "Constructs and Intents" for: hair blowing 1830 included hair strands 1832, air movement 1831; for Car HMI included LED indicators 1843, turning dial 1842, air movement 1841; for propeller 1810 included rotation 1811, blades, 1812, clunky buttons 1813, whirring 1814, grid cover 1815, air movement 1816; and for air vents 1820 included grid 1821, air movement 1822 and directional toggle 1823.

Derived from the 23 styles were 88 distinct semiotic features; these were analyzed further for consensus which indicated that 65 were commonly occurring (appearing at least twice). 32 of these were adapted by the participants into their Ultrahapticon designs.

These Ultrahapticons were subsequently decomposed into their value level components to understand the participants' expectation of the real-time interactional feedback. This included understanding any consensus regarding construct rendering; what spatial, temporal and spatiotemporal parameters were used to signify feature intents; location of the sensations on the hand, axial direction of the pinch gesture and the dynamic adaptation of the sensation to reflect the feature adjustment.

Limited consensus was observed among the participants during the technical "value level" part of the study and sometimes the concepts were not feasible. Therefore, some results were adapted based on literature heuristics and where high disagreement occurred, all variations were considered for that icon style. Additionally, frequently reoccurring constructs and intents from popular styles that weren't selected for haptification by participants were reimagined as sensations by the investigator on the basis that these may have been discarded purely due to the participants' partial understanding of feasibility. This was exacerbated by the language barrier in some cases which was the only cultural difference observed in the study. To refine the resultant 30 user-centered Ultrahapticons, a remote workshop was conducted with four mid-air haptic experts. The Ultrahapticon design process was described to the attendees after which they were asked to rate each concept on a five-point Likert scale pertaining to feature appropriateness, expected salience, naturalism, instant recognizability, perspicuity, and technical feasibility. They then provided expert consultation on how to adapt the designs to improve the aforementioned aspects. The data from the workshop was used to hone the concepts and the result was a shortlist of 17 sensations for 7 features.

Figure 18:
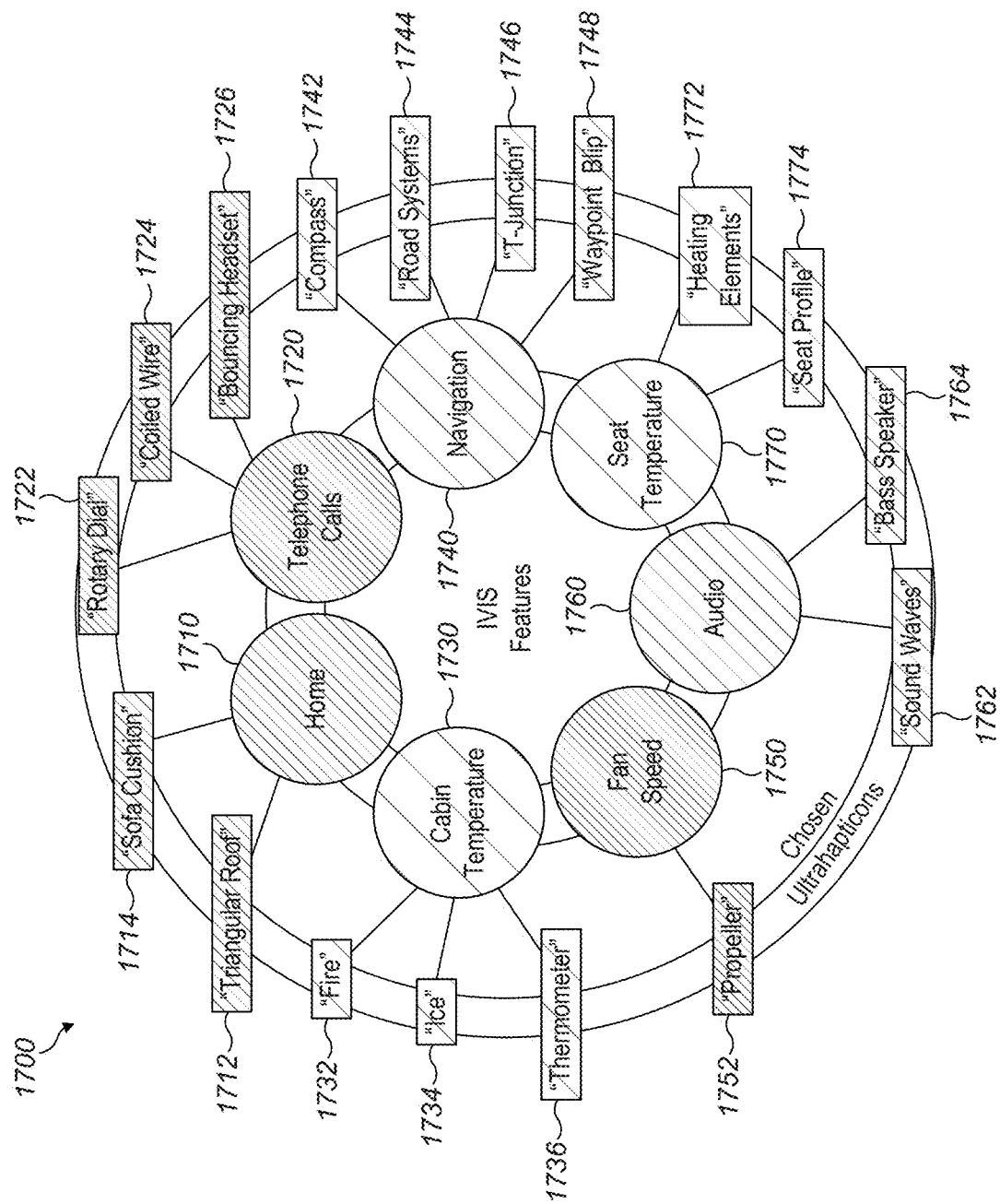
FIG. 18 shows a diagram of Ultrahapticon concepts.

FIG. 18 shows a process map 1700 for these 7 IVIS features and their associated chosen 17 Ultrahapticons.

For IVIS feature Telephone Calls 1720, the chosen Ultrahapticons were "Rotary Dial" 1722, "Coiled Wire" 1724, "Bouncing Headset".

For IVIS feature Audio 1760, the chosen Ultrahapticons were "Sound Waves" 1762 and "Bass Speaker" 1764.

For IVIS feature Cabin Temperature 1730, the chosen Ultrahapticons were "Fire" 1732, "Ice" 1734, and "Thermometer" 1736.

For IVIS feature Seat Temperature 1770, the chosen Ultrahapticons were "Heating Elements" 1772 and "Seat Profile" 1774.

For IVIS feature Navigation 1740, the chosen Ultrahapticons were "Compass" 1742 (both "Compass In" and "Compass Out"), "Road Systems" 1744, "T-Junction" 1746, "Waypoint Blip" 1748.

For IVIS feature Fan Speed 1750, the chosen Ultrahapticon was "Propeller" 1752.

For IVIS feature Home 1710, the chosen Ultrahapticons were "Sofa Cushion" 1714 and "Triangular Roof" 1712.

G. Conclusions and Future Work

The next phase in this research may determine the most articulate icons from the shortlist; the icons will be prototyped along with synchronous hand poses based on established psychophysical principles and then evaluated in a salience study. An initial objective will be to understand the "articulatory directness" of the icons, that is the strength of the link between feature and metaphor and whether the icon rendering reflects the intended symbolism. This includes identifying the optimal way of manipulating haptic spatiotemporal dimensions to reflect the dynamic interaction with a specific feature.

The next study may also focus on perceptual optimization of the icon set by testing the icons' salience under simulated workload similar to that of a driving task. This will determine whether certain icons are masked through cognitive load and whether some sensations are confused with others within the set. When eventually tested in a driving simulator, this design process will improve the likelihood of validating distraction and task time measures associated with this MAHG concept without perception confounds.

IV. CONCLUSION

The various features of the foregoing embodiments may be selected and combined to produce numerous variations of improved haptic-based systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method comprising:
    detecting movement of a human hand issuing an activation command for an automotive function; to confirm the activation command, creating tactile sensations on a target on a human hand by using a phased array of ultrasound transducers to transmit ultrasound waves to exert an acoustic radiation force on the human skin in mid-air;
    adjusting a phase emitted by each ultrasound transducer such that the ultrasound waves arrive concurrently at the target in order to maximize the acoustic radiation force exerted;
    wherein the maximize the acoustic radiation force exerted is directed at least one finger of the human hand by adjusting threshold value, frequency, and pattern propagation in view of mechanoreceptor density of the human hand, such that a 2-point discrimination threshold is achieved on at least one finger of the human hand.

2. The method as in claim 1, wherein adjusting the threshold value, the frequency, and the pattern propagation in view of the mechanoreceptor density of the human hand results in single focal point that travels along a path rendered at around a 35-degree angle from right to left in three sequential locations going up an index finger towards the tip.

3. The method as in claim 2, wherein the at least one finger is two adjacent fingers.

4. The method as in claim 3, wherein adjusting the threshold value, the frequency, and the pattern propagation in view of the mechanoreceptor density of the human hand results in pulsing sensation at fingertip ends of the two adjacent fingers.

5. The method as in claim 3, wherein adjusting the threshold value, the frequency, and the pattern propagation in view of the mechanoreceptor density of the human hand results in a two bar sensation that starts in between a middle finger and an index finger that increases in size as it travels up the index finger and the middle finger.

6. The method as in claim 3, wherein adjusting the threshold value, the frequency, and the pattern propagation in view of the mechanoreceptor density of the human hand results in focal points jumping randomly from one location on one finger to another on another finger with equal intervals.

7. The method as in claim 3, wherein adjusting the threshold value, the frequency, and the pattern propagation in view of the mechanoreceptor density of the human hand results in: (1) a double bar effect that accelerates up an index finger and a middle finger and decelerates as it reaches fingertips where it pauses momentarily; (2) the double bar effect accelerates down the human hand and then decelerates as it reaches a bottom of a palm where the double bar effect pauses momentarily again; and (3) the double bar effect slides back to its original position.

8. The method as in claim 1, wherein the at least one finger of the human hand comprises a thumb of the human hand.

9. The method as in claim 8, wherein adjusting the threshold value, the frequency, and the pattern propagation in view of the mechanoreceptor density of the human hand results in a solid double bar effect actuating on the thumb.

10. The method as in claim 8, wherein adjusting the threshold value, the frequency, and the pattern propagation in view of the mechanoreceptor density of the human hand results in: (1) a double bar haptic sensation at tips of an index finger and a middle finger; (2) the double bar haptic sensation accelerates down the index finger and the middle finger and decelerates as it reaches a base of a thumb where it pauses momentarily; (3) the double bar haptic sensation then accelerates up towards the thumb where it decelerates at a thump tip and pauses momentarily; and (4) the double bar haptic sensation accelerates down to a base of the thumb, pauses momentarily and then accelerates back up the index finder and the middle finger and then decelerates.

* * * * *